(12) United States Patent
Zhao et al.

(10) Patent No.: US 9,994,775 B2
(45) Date of Patent: Jun. 12, 2018

(54) PROCESS FOR PRODUCING MESOPHASE PITCH BY HYDROGENATION OF HIGH-TEMPERATURE COAL TAR

(75) Inventors: Hongmei Zhao, Saihan District (CN); Jieshan Qiu, Dalian (CN); Kam Shing Philip Siu, North Point (HK); Baoming Li, Saihan District (CN); Junde Steve Lu, North Point (HK); Nan Xiao, Dalian (CN)

(73) Assignees: ECO ENVIRONMENTAL ENERGY RESEARCH INSTITUTE LIMITED, Hong Kong (CN); DALIAN UNIVERSITY OF TECHNOLOGY, Dalian (CN)

(*) Notice: Subject to any disclaimer, the term of this patent is extended or adjusted under 35 U.S.C. 154(b) by 819 days.

(21) Appl. No.: 14/372,006

(22) PCT Filed: Apr. 6, 2012

(86) PCT No.: PCT/CN2012/000451
§ 371 (c)(1),
(2), (4) Date: Oct. 30, 2014

(87) PCT Pub. No.: WO2013/104092
PCT Pub. Date: Jul. 18, 2013

(65) Prior Publication Data
US 2015/0076031 A1    Mar. 19, 2015

(30) Foreign Application Priority Data
Jan. 12, 2012 (CN) .......................... 2012 1 0009243

(51) Int. Cl.
| C10C 1/14 | (2006.01) |
|---|---|
| C10C 1/18 | (2006.01) |
| C10C 3/06 | (2006.01) |
| C10G 67/04 | (2006.01) |
| C10C 3/00 | (2006.01) |
| C10C 1/00 | (2006.01) |
| C10C 1/16 | (2006.01) |
| C10C 1/19 | (2006.01) |
| C10G 50/00 | (2006.01) |
| C10G 1/00 | (2006.01) |
| C10G 1/06 | (2006.01) |
| C10G 3/00 | (2006.01) |
| C10C 1/20 | (2006.01) |
| C10G 31/10 | (2006.01) |

(52) U.S. Cl.
CPC .............. *C10C 3/002* (2013.01); *C10C 1/005* (2013.01); *C10C 1/16* (2013.01); *C10C 1/18* (2013.01); *C10C 1/19* (2013.01); *C10C 1/205* (2013.01); *C10C 3/06* (2013.01); *C10G 1/002* (2013.01); *C10G 1/06* (2013.01); *C10G 3/50* (2013.01); *C10G 31/10* (2013.01); *C10G 50/00* (2013.01); *C10G 67/04* (2013.01); *Y02P 30/20* (2015.11)

(58) Field of Classification Search
CPC combination set(s) only.
See application file for complete search history.

(56) References Cited

U.S. PATENT DOCUMENTS

| 4,116,815 A | 9/1978 | Sunago et al. |
|---|---|---|
| 4,589,975 A | 5/1986 | Yudate et al. |
| 4,645,584 A * | 2/1987 | Didchenko ............... C10C 3/00 208/143 |

FOREIGN PATENT DOCUMENTS

| CN | 85105609 A | 1/1987 |
|---|---|---|
| CN | 87103787 A | 12/1987 |
| CN | 85107441 A | 4/1989 |
| CN | 1072442 A | 5/1993 |
| CN | 101074381 A | 11/2007 |
| CN | 101475818 A | 7/2009 |
| CN | 100532509 C | 8/2009 |
| CN | 101508903 A | 8/2009 |
| GB | 849987 | 9/1960 |
| JP | 58-214531 A | 12/1983 |
| JP | 63-150377 A | 6/1988 |
| JP | 63150377 A * | 6/1988 |
| JP | 63-162784 A | 7/1988 |
| JP | 63162784 A * | 7/1988 |

(Continued)

OTHER PUBLICATIONS

M. Sekiguchi et al., JP 63-150377 A (English translation).*
K. Murakami et al., JP 63-162784 A (English translation).*
H. Teranishi et al., JP 07-33514 B2 (English translation).*
Extended European Search Report, EP Application No. 12865271.6, dated Jun. 29, 2015, 7 pages.
International Search Report, PCT/CN2012/000451, dated Oct. 24, 2012, 6 pages.

(Continued)

*Primary Examiner* — Randy Boyer
(74) *Attorney, Agent, or Firm* — Baker McKenzie LLP

(57) ABSTRACT

A process for producing mesophase pitch from high-temperature coal tar comprises: removing salts and quinoline insoluble fraction from a high-temperature coal tar to obtain a decant oil; using the decant oil as a hydrogenation feedstock, or pre-distilling the decant oil to obtain a residue with a boiling point higher than 230 and formulating the residue into a hydrogenation feedstock; catalytic hydrorefining the hydrogenation feedstock to obtain a hydrofined oil; distilling the hydrofined oil to obtain hydrogenated pitch; and subjecting the hydrogenated pitch to the thermal polymerization to obtain the mesophase pitch. The process has features such as an easily controllable degree of hydrogenation, complete removal of impurities, good raw material flowability, not tending to form the carbon deposition and the coking during the process, and not tending to jam the reactor. The product has a high content of mesophase pitch, a low softening point and a low impurity content.

39 Claims, 4 Drawing Sheets

(56) References Cited

FOREIGN PATENT DOCUMENTS

| | | | |
|---|---|---|---|
| JP | 07033514 A | * | 2/1995 |
| JP | 7-33514 B2 | | 4/1995 |
| JP | 10-102067 | | 4/1998 |

OTHER PUBLICATIONS

Chinese Office Action, CN Application No. 201210009243.2, dated Mar. 26, 2015, 9 pages (listing of documents cited in Action at pp. 7-8).
Korean Office Action dated Mar. 14, 2017 in connection with Korean Application No. 10-2014-7022602, 16 pages.

* cited by examiner

PROCESS FOR PRODUCING MESOPHASE PITCH BY HYDROGENATION OF HIGH-TEMPERATURE COAL TAR

TECHNICAL FIELD

The invention belongs to new carbon material and fuel chemical engineering field, and specifically relates to a process suitable for preparing mesophase pitch from high-temperature coal tar in industrial scale

BACKGROUND ART

China is the world's top coke producer. Statistical information shows that China produces 388,000,000 tons of coke in 2010, accounting for 60% of the world's output. The coal-tar resources are abundant in China, wherein the production of the coal-tar recycled from coke-oven gas reaches 18,000,000 tons.

In China, the technical route for processing the high-temperature coal tar is basically an approach of producing BTX Fraction, carbolic oil, naphthalene oil, wash oil, anthracene oil and pitch by distilling the tar, the products of which lack variety. In the recent years, since the project with a coal-tar processing scale of 300,000 tons is implemented, the variety of the refined chemical product therefrom is continually increasing. However, because of the poor yields of these products, it can only be focused on the refining processing of carbolic oil, naphthalene oil, wash oil and anthracene oil for the actual products. Meanwhile, the main problem brought by such processing route is serious environmental pollution. Since the resulted pitch only can be further processed to yield low value-added products such as mid-temperature pitch, modified pitch and pitch coke and so forth, the value of pitch cannot be reflected, which causes the products in the whole project being low added-value, and non-ideal benefits.

There is an increasing and rapidly expanding global need for new materials, especially advanced carbon materials, with the technology progress and the ever-increasing enhancement of environmental protection requirement. All of pitch-based carbon fiber, carbon foam, C/C composite, mesocarbon microbeads and so forth show an extremely wide application prospect. However, the industrial-scale production of novel carbon materials, especially mesophase pitch, a precursor of advanced carbon materials, is bogging down. Most of the technical solutions are still in the experimental stage, rarely to be suitable for the industrial-scale production. The existing industrial production technology of mesophase pitch always face the problems of difficult technologies and high costs, which limit the application and promotion of the novel carbon materials.

The production of needle coke and mesophase pitch from coal tar pitch is always the research hotspot for the Chinese engineers. After years of effort, positive progress has been made in the industrial production of the needle coke. However, because of the inherent limitations of the coal tar pitch, even though extensive research has been carried out, limited success has be accomplished in the field of the mesophase pitch due to either high costs or high industrialization difficulties.

Chinese patent No. CN85107441A introduced a process for producing super needle coke by using a quinine insolubles (QI) free coal tar or coal tar pitch. However, the process has a low degree of catalytic hydrogenation, a difficult technology of direct hydrogenation of coal tar or coal tar pitch, and a short service life of catalyst. This process does not make full use of hydrogenated solvent oil, a byproduct, to optimize itself, which results in losing a great amount of valuable β resin, a low yield of pitch and a low degree of hydrogenation of low boiling point components.

Chinese patent No. CN87103787A introduced a process for producing mesophase pitch for high performance carbon fibers from a coal tar or a petroleum residual oil through thermal treatment and the hydrogenation from solvent. The process requires a lot of xylene, hydrogenated anthracene oil and wash oil solvent which cannot be self-produced by the process, resulting in a high production cost. As a technology for heating processing with multi-stage pyrolysis and flash is employed, it's very easy to cause coking and jamming in system, resulting in difficulties in large-scale continuous production.

Chinese patent No. CN85105609A disclosed a process for hydrogenating coal tar or coal tar pitch, wherein the catalyst metal has a low loading amount and low activity, and was poor in the removal of heteroatom of pitch. The process employed single means of mild catalytic hydrogenation which can hardly change the molecular structure. Moreover, coal tar or coal tar pitch has a high content of colloid and asphaltene, which causes easy carbon deposition and short service life of the catalyst under the fixed bed catalytic conditions and a difficulty in hydrogenation, therefore, an effective hydrogenation in a long run can hardly be achieved.

Chinese patent No. ZL200610032060.7 introduced a process for producing fuel oil by hydrogenation of coal tar, which required converting all distillation fractions of the high-temperature coal tar into naphtha, gasoline and diesel, and had high requirements for the catalyst activity and hydrogenation reaction conditions.

Chinese patent No. CN101074381A introduced a process for processing and utilizing coal tar, the target product of which is gasoline and diesel. It did not mention the research for the pitch therein. The preprocessing of coal tar therein needs to be optimized.

The invention aims at overcoming the disadvantages in the prior art, raising a new approach for processing and utilizing the high-temperature coal tar, and providing a process suitable for industrialization application for producing mesophase pitch from the catalytic hydrogenation of high-temperature coal tar with byproducts such as carbolic oil, crude naphthalene, naphtha and gasoline and diesel blending components, to increase the value of the coal tar processing products by a large margin.

SUMMARY OF THE INVENTION

One aspect of the invention is to provide a process for producing mesophase pitch from high-temperature coal tar, comprising:

(1) removing salts and quinoline insoluble fraction from a high-temperature coal tar to obtain a decant oil;

(2) obtaining a hydrogenation feedstock from the decant oil via either of the following two approaches:

(2a) using the decant oil as the hydrogenation feedstock; or (2b) pre-distilling the decant oil to obtain a residue with a boiling point higher than 230, and mixing the residue with formulated oil to obtain the hydrogenation feedstock, wherein the formulated oil comprising one or more components selected from the group consisting of distillation fractions of coal tar and the hydrogenated product of the distillation fractions of coal tar;

catalytic hydrorefining the hydrogenation feedstock to obtain a hydrofined oil;

(3) distilling the hydrofined oil to obtain hydrogenated pitch;

(4) subjecting the hydrogenated pitch to the thermal polymerization to obtain the mesophase pitch.

In some embodiments, the step (1) comprises:

(1a) a step of removing salts, comprising mixing deionized water and an aromatic solvent with the high-temperature coal tar, and centrifuging them to remove washing water to obtain a desalted high-temperature coal tar with the aromatic solvent; wherein the aromatic solvent comprises one or more components selected from the group consisting of benzene, toluene, xylene, distillation fractions of coal tar and hydrogenation product of the distillation fractions of coal tar.

In some embodiments, in the step (1a) of removing salts, the volume ratio of the high-temperature coal tar to the aromatic solvent is 1:0.2-2, the volume ratio of the deionized water to the high-temperature coal tar is 0.5-3, and the deionized water is used to wash the high-temperature coal tar 1-3 times. Preferably, the volume ratio of the high-temperature coal tar to the aromatic solvent is 1:0.2-0.8.

In some embodiments, the step (1) comprising:

(1b) a step of removing quinoline insoluble fraction, comprising adding a aliphatic solvent and optional the aromatic solvent into the desalted high-temperature coal tar with the aromatic solvent, and followed by centrifuging or sedimentation to remove the quinoline insoluble fraction; the aliphatic solvent comprises $C_4$-$C_{16}$ aliphatic compounds; wherein the final volume ratio of the high-temperature coal tar, the aromatic solvent and the aliphatic solvent is 1:0.2-2:0.2-1. Preferably, the final volume ratio of the high-temperature coal tar, the aromatic solvent and the aliphatic solvent is 1:0.3-0.8:0.3-0.8.

In some embodiments, the aliphatic solvent is n-octane or n-heptane.

In some embodiments, the predistillation in the step (2b) comprises a step of recycling aliphatic solvent.

In some embodiments, the predistillation in the step (2b) comprises a step of obtaining at least one of BTX fraction, carbolic oil and naphthalene oil.

In some embodiments, the step (2) further comprises a filtering step for filtering the particles with particle size greater than 10 μm prior to the catalytic hydrorefining.

In some embodiments, in the step (2), the catalytic hydrorefining is conducted under conditions of a total pressure of 12.0 MPa-20.0 MPa, an average reaction temperature of 320-400, liquid hourly space velocity of 0.5 $hr^{-1}$-2.0 $hr^{-1}$, and a hydrogen-oil ratio of 600:1-1500:1. Preferably, the catalytic hydrorefining is conducted under conditions of a total pressure of 14.0 MPa-18.0 MPa, an average reaction temperature of 340-390, liquid hourly space velocity of 0.8 $hr^{-1}$-1.2 $hr^{-1}$, and a hydrogen-oil ratio of 800:1-1200:1.

In some embodiments, in the step (2), the catalytic hydrorefining is conducted in the presence of the following catalyst:

hydrorefining catalyst A: employing alumina or silica-alumina as a carrier which has a specific surface area of 120-300 $m^2$/g, a pore volume of 0.4-1.4 mL/g, a pore diameter of 8-20 nm, and a surface acid content of 0.05-0.1 mmol/g, and Mo or W of the group VIB metals and Co or Ni of the group VIII metals as metallic active components, based on the total weight of the hydrorefining catalyst A, the content of the group VIB metals accounted in oxide is 15-45 wt %, and the content of the group VIII metals accounted in oxide is 1.5-5 wt %.

In some embodiments, in the step (2), the catalytic hydrorefining is conducted in the presence of the following two catalysts:

hydrorefining catalyst A: employing alumina or silicon-containing alumina as a carrier, which has a specific surface area of 120-300 $m^2$/g, a pore volume of 0.4-1.4 mL/g, a pore diameter of 8-20 nm, a surface acid content of 0.05-0.1 mmol/g; and Mo or W of the group VIB metals and Co or Ni of the group VIII metals as metallic active components, based on the total weight of the hydrorefining catalyst A, the content of the group VIB metals accounted in oxide is 15-45 wt %, and the content of the group VIII metals accounted in oxide is 1.5-5 wt %;

hydrorefining catalyst B: employing alumina or silicon-containing alumina as a carrier, which has a specific surface area of 120-300 $m^2$/g, a pore volume of 0.4-1.2 mL/g, a pore diameter of 7-15 nm; and Mo or W of the group VIB metals and Co or Ni of the group VIII metals as metallic active components; based on the total weight of the hydrorefining catalyst B, the content of the group VIB metals accounted in oxide is 10-22 wt %, and the content of the group VIII metals accounted in oxide is 2-5 wt %.

In some embodiments, in the step (2), the hydrogenation feedstock is catalytic hydrorefined after passing through a protection catalyst and a demetalization catalyst, the demetalization catalyst employing alumina as a carrier which has a pore volume of 0.5-1.5 mL/g, a specific surface area of 180-350 $m^2$/g, a pore diameter of 10-50 nm; based on the total weight of the demetalization catalyst, the demetalization catalyst contains 7-20 wt % of molybdenum oxide and 2-5 wt % of nickel oxide.

In some embodiments, in the step (3), the distilling comprises a step of obtaining a hydrogenated high boiling point solvent with a boiling spread of 300-360° C. and a hydrogenated distillation fraction with a boiling spread of 80-300° C.

In some embodiments, the step (1) comprises:

(1a) a step of removing salts, comprising mixing deionized water and aromatic solvent with the high-temperature coal tar, and centrifuging them to remove washing water, obtaining a desalted high-temperature coal tar with the aromatic solvent, wherein the aromatic solvent is the hydrogenated high boiling point solvent.

In some embodiments, the step (1) comprises:

(1b) a step of removing quinoline insoluble fraction, comprising adding aliphatic solvent and optional the aromatic solvent into the desalted high-temperature coal tar with the aromatic solvent, mixing and centrifuging them or standing them for sedimentation to remove the quinoline insoluble fraction, the aliphatic solvent comprises $C_4$-$C_{16}$ aliphatic compounds, the aromatic solvent is the hydrogenated high boiling point solvent, wherein the final volume ratio of the high-temperature coal tar, the aromatic solvent and the aliphatic solvent is 1:0.3-0.8:0.3-0.8. Preferably, the final volume ratio of the high-temperature coal tar, the hydrogenated high boiling point solvent and the aliphatic solvent is 1:0.5-0.8:0.5-0.8.

In some embodiments, in the step (2b), the formulated oil comprises the hydrogenated high boiling point solvent and the hydrogenated distillation fractions.

In some embodiments, in the step (2b), the formulated oil comprises the hydrogenated high boiling point solvent, BTX fraction, wash oil and the hydrogenated distillation fractions.

In some embodiments, the volume ratio of the BTX fraction or wash oil: the hydrogenated high boiling point solvent: the hydrogenated distillation fractions: the residues is 0.2-1:0-1:0-1:1. Preferably, the volume ratio of the BTX fraction or wash oil: the hydrogenated high boiling point solvent: the hydrogenated distillation fractions: the residues is 0.2-0.4:0-0.5:0-0.5:1.

In some embodiments, the thermal polymerization in the step (4) comprises a step of obtaining a flash oil.

In some embodiments, the process of the invention further comprises:

(5) catalytic hydrocracking the hydrogenated high boiling point solvent and the flash oil after mixing them to obtain a hydrocracking product.

In some embodiments, the catalytic hydrocracking is conducted under conditions of a total pressure of 12.0 MPa-20.0 MPa, an average reaction temperature of 340-420, a liquid hourly space velocity of 0.5 $hr^{-1}$-2.0 $hr^{-1}$, and a hydrogen-oil ratio of 600:1-1500:1. Preferably, the catalytic hydrocracking is conducted under conditions of a total pressure of 14.0 MPa-18.0 MPa, an average reaction temperature of 350-390, a liquid hourly space velocity of 0.8 $hr^{-1}$-1.5 $hr^{-1}$, and a hydrogen-oil ratio of 800:1-1200:1.

In some embodiments, the catalytic hydrocracking is conducted in the presence of the following catalyst:

hydrocracking catalyst: employing alumina, amorphous silica-alumina and micropore and mesopore molecular sieve as a carrier, wherein, based on the total weight of the hydrocracking catalyst, the mesopore molecular sieve accounts for 10-15 wt %, the micropore molecular sieve accounts for 5-10 wt %, the amorphous silica-alumina accounts for 15-40 wt %, the alumina accounts for 35-70 wt %; the specific surface area is 150-350 $m^2$/g, and the pore volume is 0.1-1.0 mL/g; the loaded catalyst contains 10-35 wt % of $MoO_3$ and/or $WO_3$, and 2-5 wt % of NiO and/or CoO.

In some embodiments, the catalytic hydrocracking is conducted in the presence of the following two catalysts:

hydrocracking catalyst: employing alumina, amorphous silica-alumina and micropore and mesopore molecular sieve as a carrier; wherein, based on the total weight of the hydrocracking catalyst, the mesopore molecular sieve accounts for 10-15 wt %, the micropore molecular sieve accounts for 5-10 wt %, the amorphous silica-alumina accounts for 15-40 wt %, the alumina accounts for 35-70 wt %; the specific surface area is 150-350 $m^2$/g, the pore volume is 0.1-1.0 mL/g; the loaded catalyst contains 10-35 wt % of $MoO_3$ and/or $WO_3$, and 2-5 wt % of NiO and/or CoO;

hydrorefining catalyst B: employing alumina or silicon-based alumina as a carrier, which has a specific surface area of 120-300 $m^2$/g, a pore volume of 0.4-1.2 mL/g, a pore diameter of 7-15 nm; and Mo or W of the group VIB metals and Co or Ni of the group VIII metals as metallic active components; based on the total weight of the hydrorefining catalyst B, the content of the group VIB metals accounted in oxide is 10-22 wt %, and the content of the group VIII metals accounted in oxide is 2-5 wt %.

In some embodiments, the distilling is conducted after mixing the hydrofined oil with the hydrocracking product in a volume ratio of 1:0.2-0.5 in the step (3).

In some embodiments, the step (3) further comprises a filtering step for removing the particles with particle sizes greater than 10 μm prior to the distilling.

In some embodiments, the step (3) comprises a step of obtaining naphtha, gasoline blending component and diesel blending component.

In some embodiments, the thermal polymerization in the step (4) is conducted for 180-1200 minutes under conditions of a pressure of 0.01-3.0 MPa, a temperature of 380-460, with a stirring rate of 10-60 rpm, and purging hydrogen, nitrogen or argon at the bottom and top of the reactor. Preferably, the thermal polymerization in the step (4) is conducted for 180-600 minutes under conditions of 0.01-1.0 MPa and a temperature of 400-440, with a stirring rate of 20-40 rpm, and purging nitrogen at the bottom and top of the reactor.

In some embodiments, the step (4) comprises online viscosity analysis.

In some embodiments, a step of extracting with a solvent is comprised between the steps (3) and (4).

In some embodiments, the solvent is an aromatic solvent comprising benzene, toluene, pyridine, quinoline or tetrahydrofuran.

Via the catalytic hydrogenation of coal tar in hydrogen and in the presence of hydrogenation solvent, the inventor of the application enhances the H/C ratio of the coal tar pitch, adjusts the molecular structure of the coal tar pitch, and removes S, N and O atoms and metal impurities. The quality of the mesophase pitch can be increased substantially by producing the same from hydrogenated coal tar pitch, which provides a feasible process route for the industrial scale production of mesophase pitch. The resulted product has high content of mesophase pitch, a low softening point and low impurity content.

DETAILED EMBODIMENTS

The method of the invention will be described below in conjunction with the drawings.

Figure 1:
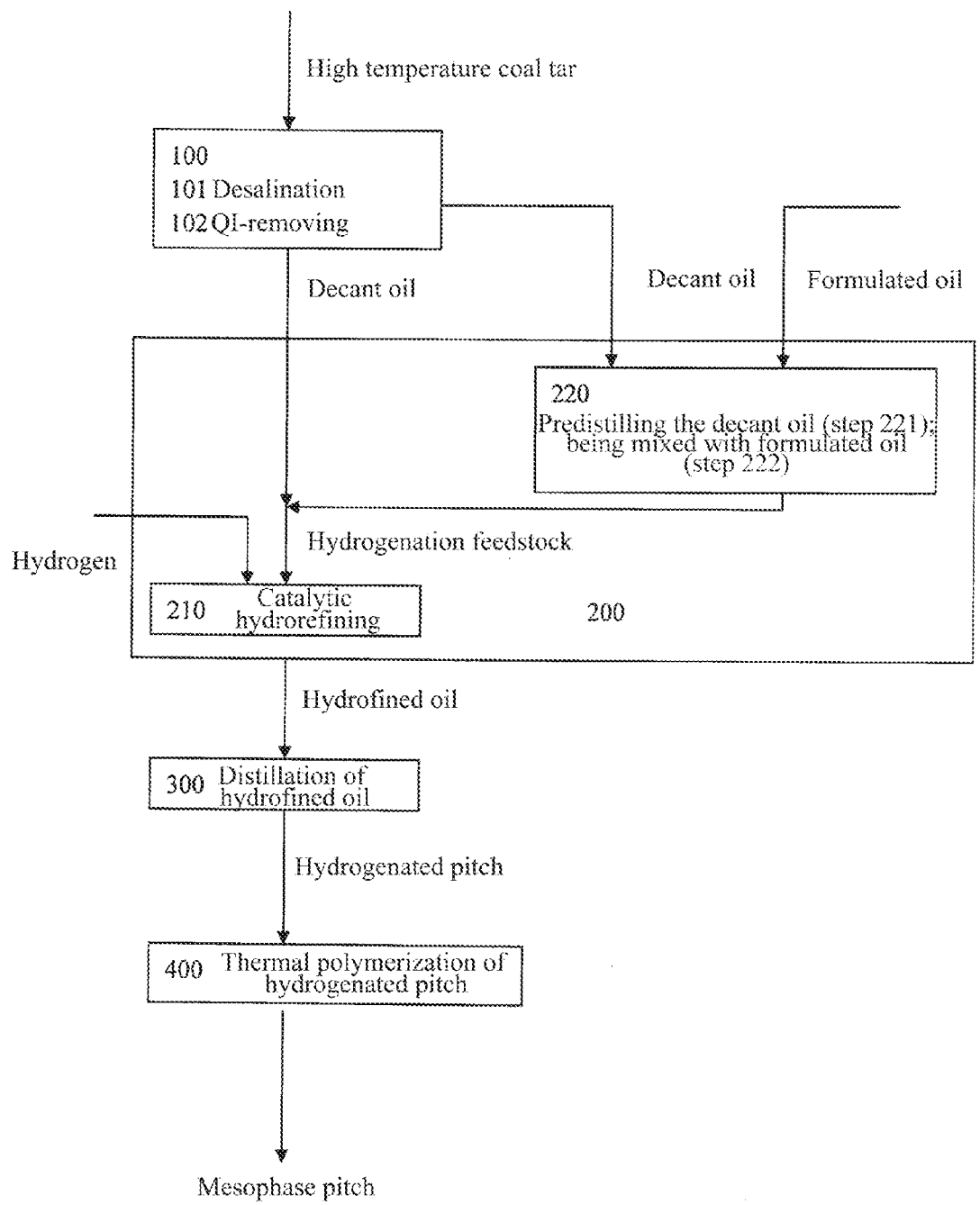
FIG. 1 is a schematic diagram of the process of the invention for producing mesophase pitch from high-temperature coal tar.

As shown in FIG. 1, the method of the invention for producing mesophase pitch from high-temperature coal tar comprises the following steps:

Step 100 is to remove salts and quinoline insoluble fraction from the high-temperature coal tar to produce a decant oil;

Specifically, step 100 comprises step 101 of removing salts and step 102 of removing quinoline insoluble fraction. The step 101 of removing salts comprises mixing deionized water and an aromatic solvent with the high-temperature coal tar, and centrifuging them to remove washing water to obtain desalted high-temperature coal tar with aromatic solvent; wherein, the aromatic solvent comprises one or more components selected from the following group consisting of benzene, toluene, xylene, distillation fraction of coal tar and the hydrogenated product of distillation fraction of coal tar; the step 102 of removing quinoline insoluble fraction comprises adding a aliphatic solvent and an optional aromatic solvent into the desalted high-temperature coal tar with the aromatic solvent, mixing and centrifuging them or sedimenting the same to remove the quinoline insoluble fraction; the aliphatic solvent comprises $C_4$-$C_{16}$ aliphatic compounds, and the aromatic solvent is the hydrogenated high boiling point solvent, wherein the final volume ratio of the high-temperature coal tar, the aromatic solvent and the aliphatic solvent is 1:0.2-2:0.2-1.

Step 200 is to produce a hydrofined oil (step 210) by catalytic hydrorefining a hydrogenation feedstock prepared from the decant oil via either of the following two approaches. In an embodiment, the decant oil is took as a hydrogenation feedstock; and in another embodiment, pre-distilling the decant oil to obtain a residue having a boiling point greater than 230° C. (step 221), mixing the residue with formulated oil (step 222) to obtain a hydrogenation feedstock (step 220), wherein the formulated oil comprises one or more components selected from the group consisting of distillation fraction of coal tar and the hydrogenated product of the distillation fraction of coal tar;

Step 300 is to produce a hydrogenated pitch by distilling the hydrofined oil;

Step 400 is to produce a mesophase pitch by thermal polymerizing the hydrogenated pitch.

Specifically, the invention relates to a process for producing mesophase pitch via thermal polymerization of hydrogenated pitch which is prepared by catalytic hydrogenation in hydrogen in the presence of hydrogenation solvent, with byproducts naphtha, gasoline and diesel blending component, carbolic oil and crude naphthalene. The four steps of the method will be described in detail below in conjunction with FIG. 2, wherein the aromatic solvent is hydrogenated high boiling point solvent, and the aliphatic solvent is n-octane. Those skilled in the art can understand that in the case that mesophase pitch is produced by using other aromatic solvents such as benzene, toluene and xylene, and other aliphatic solvents such as n-heptane, as listed herein, there would be a requirement to adjust the following technological process accordingly. When the decant oil is took as a hydrogenation feedstock directly, the following technological process would also need to be adjusted accordingly.

1) In desalination section (1), the high-temperature coal tar is mixed thoroughly with the aromatic solvent (a hydrogenated high boiling point solvent) and deionized water in a certain ratio followed by being washed and centrifuged, to remove most washing water therein; in quinoline insoluble fraction (QI) removing section (2), the resulting high-temperature coal tar is then mixed with aliphatic solvent in a certain ratio followed by being centrifuged to remove quinoline insoluble fraction (QI) to produce a mixture of purified coal tar and solvents, i.e. decant oil;

2) Heating the decant oil, and passing the same into evaporator (3) to separate water and BTX Fraction (<120° C.), passing the separated water into a treatment system for sewage regeneration (not shown), passing the BTX Fraction (<120° C.) into BTX Fraction (<120° C.) tank (not shown), the water-free decant oil is obtained at the bottom of evaporator, and enters into the distillation column (4) after being heated. Aliphatic solvent with low boiling point from the top of the distillation column is recycled, BTX Fraction (120-180° C.), carbolic oil and naphthalene oil from the middle of the distillation column are each passed into their tanks respectively (not shown), and the residues of the distillation column (4) are mixed with BTX Fractions from the BTX Fraction tanks (<120° C. and 120-180° C.), or hydrogenated distillation fraction, or hydrogenated high boiling point solvent in hydrogenation feedstockmixer (5), and then enter into hydrogenation feedstock tank (not shown) after being filtered by filter group (6);

3) Mixing the hydrogenation feedstock from the hydrogenation feedstock tank with hydrogen, then heating the same prior to passing them into a reactor packed with hydrogenation protecting catalyst and demetalization catalyst to further remove impurities and metal ions. After that, pass the same into a refining reactor packed with hydrorefining catalyst A to be subjected to hydrorefining to obtain a refined oil. The above protectingly demetalized refining reaction can be carried out in an integrated protecting demetalized refining reactor (7), or can be carried out step-by-step in respective reactors. At the same time, a part of hydrogenated high boiling point solvent from vacuum distillation column (12) of subsequent section and flash oil separated from the top of synthetic reaction still (14) are passed into cracking reactor (8) packed with cracking catalyst to be subjected to hydrocracking reaction to obtain a cracking product. The ways of packing the catalysts are as following:

Refining reaction: the top of the reactor is packed with refining catalyst A, while the bottom is packed with refining catalyst B; or the reactor is packed with refining catalyst A, while the high temperature high pressure separator is packed with refining catalyst B at the upper portion, and hydrorefining catalyst A at the lower portion.

Cracking reaction: the cracker is packed with cracking catalyst, while refining catalyst B is loaded at the bottom of the reactor; or the cracker is packed with cracking catalyst, while the high temperature high pressure separator is packed with refining catalyst B.

4) Liquid hydrofined oil and liquid cracking product are mixed followed by being passed through the metal filter (9) to be filtered, then passing the filtered mixture into distillation column (10) to separate naphtha fraction with a boiling point lower than 120° C., water and acidic gases prior to being passed into ordinary pressure distillation column (11). The fractions with boiling point lower than 180° C. distilled from the top of ordinary pressure distillation column (11) is passed into the gasoline blending component storage tank (not shown), the fractions with boiling spread of 180-300° C. distilled from the middle part are passed into the diesel blending component storage tank (not shown), and the residues are passed into vacuum distillation column (12) after being heated. Hydrogenated high boiling point solvent and hydrogenated pitch are separated from vacuum distillation column (12), in which, hydrogenated high boiling point solvent is the component with a boiling spread of 300-360° C. separated from vacuum distillation column (12). A part of hydrogenated high boiling point solvent is used as a solvent for removing salts and QI from coal tar and the component for formulating hydrogenation feedstock, and the rest is used as the feedstock of hydrocracking reactor (8). Hydrogenated pitch is extracted with a solvent in extraction column (13) to further remove impurities, or is passed into synthetic reaction still (14) without solvent extraction to be subjected to thermal polymerization to obtain mesophase pitch product. The oil gas from the top of the reaction still (14) is vented after cooling, separating and washing. The separated flash oil is used as a cracking feedstock to be hydrocracked.

The high quality mesophase pitch requires a pure organic raw material having low impurity content which should have no solid impurity, low metallic element content, low oxygen-, sulphur- and nitrogen-containing heterocyclic compounds content, suitable molecular weight and molecular structure.

1) Solid Impurity

The solid impurities in coal tar are mainly primary quinoline insoluble fraction (QI), such as carbon black (free carbon), coal powder, coke powder, rust, and so forth. These primary QI impurities are harmful to the mesophase nucleating, growing and conversing into a structure of bulk mesophase pitch. Although these primary QI impurities can facilitate appearance of the mesophase sphere, they block the growth and gathering of mesophase sphere during the growing period of mesophase pitch such that mesophase pitch having good rheological properties cannot be obtained, because the primary QI impurities are easily to be adsorbed onto the surface of the appeared mesophase sphere.

In the course of high-temperature retorting of coking coal, free carbon separates out when the crude gas is under the high temperature of the coking chamber. The free carbon will be then entrained into coal tar to form some micelle or colloid having free carbon as core coated with high boiling point component outside in multi-layers. According to similarity-intermiscibility theory, some heavy oil is required to be added to "peel" these multi-layers of micelle resulting in the exposure of free carbon which is removed during preprocessing.

As coal tar is a very viscous liquid, the solid impurities contained in coal tar are easily to jam the further processing apparatus of coal tar. Therefore, the purification treatment of coal tar for removing primary QI impurities and solid impurities contained therein is a key step.

Coal tar is heavy oil having great density, high viscosity and complicate components. The processing conditions can be improved by adding the coal tar some solvents to reduce the viscosity during the preprocessing so that the preprocessing goes on wheels.

2) Metallic Elements

The metallic elements in the pitch, such as Na, K, Mg, Ca, Fe, Cu, Al, V, Ni and so forth, gather quickly resulting in a mosaic structure when the mesophase is forming. When producing a carbon material, impurities is generated therefrom, and the escape of part of the metallic ions during the carbonization of graphitization results in the formation of defects. Therefore, the metallic elements must be removed. The amount of impurities can be reduced into a required range by preprocessing washing and hydrogenation demetalization catalyst.

3) Oxygen-, Sulphur- and Nitrogen-Containing Heterocyclic Compounds

O, S and N atoms in the oxygen-, sulphur- and nitrogen-containing heterocyclic compounds have a great electronegativity, can readily induce polarization within a molecule, and accelerate the dehydrogen polycondensation during the formation of the mesophase, which is in favor of the appearance of the mesophase sphere. However, the crosslinked action brought by the O, S and N atoms increase the viscosity of the system which obstructs the growth and gather of the mesophase spheres, and reduce the degree of orientation of the molecules. Meanwhile, a mosaic structure rather than a desired structure of large coalesced regions of mesophase will be formed by accumulating the oxygen-, sulphur- and nitrogen-containing heterocyclic compounds in the appeared mesophase spheres due to the high thermostabiliztion thereof. The carbon product produced from mesophase pitch will swell during graphitization, resulting in microcrack in the product, affecting the quality of the product. These impurity atoms can be substantially removed via catalytic hydrogenation processing.

4) Molecular Weight and Molecular Structure

The atomic ratio of H/C of the carbonaceous mesophase is 0.35-0.5, the content of the volatiles is 15%-20%, and the density is $1.4$-$1.6/cm^3$. As compared with the raw material pitch, the molecular weight of the carbonaceous mesophase which averages about 2000 is 3-4 time higher, and the softening point is also increased by about 100° C. Of course, these values change with the change of pitch raw materials and the heat treatment conditions. It generally has a lower melt viscosity when above the softening point temperature, and can remain stable without decomposition for a longer time.

As a raw material for forming the mesophase pitch, the molecule thereof is required to have a suitable molecule weight, H/C ratio, a proper degree of aromaticity and structures of cyclane, and short side chains. Only the raw materials having molecular structure with the above characteristics are polymerized to form mesophase pitch under specific conditions, the desired mesophase pitch structure can be achieved. Generally, the features of the molecules of the hydrogenated pitch generated by hydrorefining are: comprising 5-10 aromatic rings, 1.5 substituent groups in average (mainly methyl), 1-5 cycloalkane structure, and a molecular weight of 250-400.

Therefore, the production of coal based mesophase pitch is actually a process of purifying and formulating a coal tar pitch. In view of the inherent limitations of coal tar pitch, the method for producing a mesophase pitch started with coal tar via purification and formulation will become more viable.

In a technology process view, the process of the invention can be divided into the following main process units, such as preprocessing, hydrorefining, the preparation of the mesophase pitch, and so forth, which can be described as follows respectively:

(I) The preprocessing of coal tar:

The preprocessing unit of coal tar aims to formulate raw materials suitable for hydrogenation unit, adjust the viscosity and density of the hydrogenation raw materials, remove mechanical impurities, remove quinoline insoluble fractions QI, water, salts, phenols in tar, extract Naphthalene Oil having a higher additional value, obtain raw materials suitable for hydrorefining, and avoid corrosion and blocking of the system.

While removing the primary quinoline insoluble fraction, the removal of β resin (i.e., toluene-insoluble-quinoline-soluble fraction (TI-QS)) and γ resin (i.e., heptane-insoluble-toluene-soluble fraction (HI-TS)) is avoid as much as possible so as to increase the yield of the mesophase pitch and maintain the effective components. However, the thermosensitive components should be removed to avoid the carbon deposition in the catalyst bed caused thereby. The loss of the β resin and the γ resin can be reduced by removing QI from coal tar instead of from coal tar pitch.

There are plenty of salts dissolved in the water contained in coal tar, when being heated, the ammonium salts (predominantly $NH_4Cl$) therein will produce highly corrosive free acids which will corrode the pipelines and the equipments, and have bad effects on the catalysts. Since the metal content of the pitch is required to be controlled, the desalination cannot be conducted via an alkaline process. The ammonium salts and metal salts can be removed by washing. Meanwhile, the water therein is removed as much as possible so as to meet the standard of water-free raw material to reduce the contents of the ammonium salts and metal salts in the coal tar.

The oxy-compound in coal tar is mainly concentrated in the Carbolic Oil, therefore, taking the Carbolic Oil out of coal tar can reduce the consumption of hydrogen during the hydrogenation, and avoid the affect on the control of system pressure and catalysts brought by the combined water generated by Carbolic Oil during the hydrogenation.

The reason why the wash oil with high economic value is not extracted is that wash oil and the hydride thereof are important solvents, can reduce the vaporization temperature during the distillation, and avoid the polymerization of the high-molecular compound of the raw material before entering the hydrogenation reduction condition.

(1) The Desalination of Coal Tar

Besides metal salts, there are plenty of ammonium salts contained in coal tar. Volatile ammonium salts can be removed during the final dewatering process, while most of the ammonium salts are still in the dewatered coal tar. Washing is an effective means for desalination, as the production of the mesophase pitch requires a restrict control over the metal ions content, and an alkaline process can not be used here to neutralize the ammonium salts. Furthermore, desalination by washing can also lighten the load of the demetalization catalysts.

The ammonium salts and metallic salts are mainly hydrochlorides, sulphates, sulfites, nitrates, thiocyanates, thus most of the ammonium salts and metallic salts can be removed by washing. However, coal tar is heavy oil having great density and containing amounts of colloid asphaltene. A lot of emulsified oil will be formed due to the bad intermiscibility of the two. Therefore, demulsification is necessary when the coal tar is going to be dewatered.

In practice, aromatic solvents, such as BTX Fraction, hydrogenated BTX Fraction, wash oil, hydrogenated wash oil, anthracene oil, hydrogenated anthracene oil and hydrogenated high boiling point solvent, have a function of demulsification due to their capability of dissolving colloid asphaltene micelle. The experiment results indicate that the above aromatic solvents all have a good function in demulsification. After the aided centrifugal dewatering, the water content of coal tar can be controlled to be less than 2%, and the salt content is also reduced substantially.

Hydrogenated high boiling point solvent is a fraction with a boiling spread of 300~360° C. obtained by distilling the mixture of the hydrofined oil and the cracking product. Allowing for the separation of the mixed oil and water and the recovery of the aliphatic solvents used for removing insolubles after washing, it is more reasonable to employ the aromatic solvent with high boiling point to remove the salts. Employing wash oil, hydrogenated wash oil, anthracene oil, hydrogenated anthracene oil and hydrogenated high boiling point solvent has less impact on the density of coal tar. Formulating the density of the mixed oil to be 1.05-1.1 facilitates the separation of oil and water.

Since the corrosion of the equipments and the damage of the performance of the catalysts are mainly because of hydrochloric acid generated from the decomposition of ammonium chloride, the chloride ion content is taken as a control washing index. After being washed, coal tar will have a chloride ion content of less than 5 ppm.

(2) The Removal of Quinoline Insoluble Fractions (QI) from Coal Tar

The aliphatic solvents are required to be formulated into the coal tar for the removal of quinoline insoluble fractions. However, since formulating the aliphatic solvents into the coal tar would lead to a situation in which the density of the mixed oil would be less than 1, the removal of salts and the removal of quinoline insoluble fractions cannot be conducted simultaneously, and the removal of quinoline insoluble fractions cannot be conducted prior to the removal of salts, either.

According to U.S. Pat. No. 4,116,815, when coal tar or coal tar pitch is formulated with aromatic solvents and aliphatic solvents in different ratios, oil region, crystalline region, pitch region and slurry zone would be formed according to the different ratios of the solvents, wherein the QI in the slurry zone can be removed through free sedimentation.

The commonly used aromatic solvents introduced in aforementioned US patent are benzene, toluene, xylene, kreosote, wash oil, anthracene oil, and asphaltic oil obtained by distillation of coal tar; and the aliphatic solvents are n-hexane, petroleum naphtha, petroleum kerosene, gasoline and the like. When repeating the experiments recited in the above US patent, the inventor of the present Application employed aliphatic solvents such as n-octane, n-heptane, and the like, and aromatic solvents such as wash oil, anthracene oil, BTX fraction, hydrogenated BTX fractions, hydrogenated wash oil, hydrogenated anthracene oil, hydrogenated high boiling point solvents and hydrogenated distillation fractions obtained from the distillation fractions of coal tar. The results show that hydrogenated BTX fractions, hydrogenated wash oil and hydrogenated anthracene oil, due to the fatty thereof, can bring a better effect of removing QI than BTX fractions, wash oil and anthracene oil. In particular, the hydrogenated high boiling point solvent is a more suitable aromatic solvent for removing QI for the following reasons:

a) a great QI removal effect, which is mainly reflected in less percentage of the aliphatic solvents, higher percentage of coal tar, and low cost; furthermore, b) a high cure degree of QI, which leads to a lower content of QI in the decant oil after removing the QI;

c) a mainly removal of thermal-unstable macromolecules along with the removal of QI; the yield of coal tar is 85%; the removal of thermal-unstable macromolecules leads to a drastic slow down of carbon disposition of the catalyst during hydrogenation;

d) a wide range of the crystalline region, which leads to a high efficiency of QI removal aided by centrifugation;

e) removing salts and QI with hydrogenated high boiling point solvent is helpful to the recycle of aliphatic solvents; avoiding the formation of azeptrope caused by fraction with low boiling point and the aliphatic solvents;

f) a good hydrogenation degree of the pitch caused by the presence of hydrogenated high boiling point solvent, which is helpful to the smooth conducting of hydrogenation in a mild operation condition.

(3) Hydrogenated High Boiling Point Solvent

Hydrogenated high boiling point solvent is one of the key points of the invention. Hydrogenated high boiling point solvent is the fraction with a boiling spread of 300~360° C. from the mixture of the refined oil and the cracking product. The main molecular structure thereof from the mass spectrometry is 2-5 benzene, wherein 1-3 $C_4$-$C_6$ cycloalkane, 1-3 methyl and a few ethyl are comprised.

The following goals are achieved by using hydrogenated high boiling point solvent:

a) Ease of preventing the pitch micelle from turning into an independent asphaltene colloid during desalination so as to achieve the effect of demulsification and separate QI and thermal-unstable macromolecules with the help of the aliphatic solvents;

b) Facilitating the recycle of the aliphatic solvents by using hydrogenated high boiling point solvent as the solvent for removing salts and QI;

c) Facilitating the hydrogen transfer to the pitch molecules as the hydrogenations of many cycloalkanes are reversible hydrogenating-de hydrogenating process, to conduct catalytic hydrogenation along with hydrogenation with the solvent, lowering the temperature of catalytic hydrogenation, reducing the carbon deposition of the catalyst, and lengthening the service life of the catalyst.

d) Dispersing the molecules of pitch so as to prevent the polymerization of the pitch molecules during hydrogenation;

e) Facilitating the formation of pitch in the case that the high boiling point fractions of the hydrogenated high boiling point solvent join in pitch, due to naphthenic and methyl groups contained in the molecular structure of the hydrogenated high boiling point solvent.

(4) The Predistillation of Decant Oil

A decant oil is a mixed oil obtained after removing salts and QI from the coal tar. The objective of the predistillation of the decant oil is to recover the aliphatic solvents, extract naphthalene oil having high added value from tar, remove water from the mixed tar to meet the standard of water-free tar, and recover carbolic oil.

The secondary distillation temperature of the decant oil should not be too high, the objective of which is to prevent the formation of new toluene insoluble fraction (TI) and secondary quinoline insoluble fraction (QI) caused by polymerization of the macromolecules due to the pyrolysis thereof before hydrorefining, besides recovering the aliphatic solvents and taking the carbolic oil and naphthalene oil.

(5) Hydrogenation Feedstock Formulation and Filtration

Hydrogenation feedstock formulation aims at slowdown of carbon deposition of the catalyst during hydrorefining so as to carry out the catalytic hydrogenation in hydrogen in the presence of hydrogenation solvents. The technology means adopted in the hydrogenation feedstock formulation are: 1) formulating the BTX fraction, hydrogenated distillation fractions and hydrogenated high boiling point solvent with the predistillated high boiling point residues; and 2) protection filter.

Since BTX Fraction, carbolic oil and naphthalene oil components are removed in the predistillation unit and the resulted decant oil get increased density and viscosity, along with an increased probability of forming new TI and secondary QI, a solvent formulation is required to be conducted on the residues of the predistilled decant oil so as to meet the requirement for hydrogenation feedstock. The formulated oil adopted in the above process comprises one or more of the components selected in the following group consisting of the distillation fractions of coal tar, the hydrogenation product of the distillation fractions of coal tar, and the mixed oil of aliphatic solvents and the abovementioned the distillation fractions of coal tar or the hydrogenation product of the distillation fractions of coal tar. The distillation fractions of coal tar include, not be limited to, BTX Fraction, wash oil, anthracene oil, and the distillation fractions of coal tar mentioned in "Coal Chemistry Product Technology" (Xiao, Ruihua atc; Metallurgical Industry Press; September 2008; version 2, pages 201-230). The hydrogenation product of the distillation fractions of coal tar include, not be limited to, hydrogenated BTX fraction, hydrogenated wash oil, hydrogenated anthracene oil, hydrogenated high boiling point solvent, and the fraction of 80~300° C. of the hydrogenation product. The aliphatic solvent oils include cycloalkane solvents and diesel. The formulated oils also include benzene, toluene, and xylene.

The main functions of the formulation of the residue of the decant oil are in two types: one type is reducing density and viscosity, dispersing asphaltene colloid, the solvents to be formulated for this type of function mainly comprise benzene solvents, the distillation fractions of coal tar, the hydrogenation product of the distillation fractions of coal tar and a small amount of aliphatic solvents; the other type is formulating hydrogenation solvents during the hydrogenation, such that coal tar is catalytically hydrogenated in the presence of hydrogenation solvents, and catalytic hydrogenation and hydrogenation with solvents of coal tar are conducted simultaneously, the solvents for this type of function mainly comprise the hydrogenation product of the distillation fraction of coal tar and aliphatic solvents.

An asphaltene sediment would be formed at lower temperature in the case that the hydrogenation feedstock is formulated with a great amount of aliphatic solvents, as the residues of the decant oil contains lots of asphaltene and colloid components. Therefore, the formulation of the aliphatic solvents should be premised on no pitch sediment formed in the hydrogenation feedstock, and the residues of the decant oil should not be formulated with the aliphatic solvents alone.

Adding BTX fraction, wash oil and hydrogenated distillation fractions mainly aim at reducing the viscosity and density of the hydrogenation feedstock, reducing the molecule concentration of colloid asphaltene and dispersing the colloid asphaltene. Dispersing the colloid asphaltene prevent the deposition of micelle formed by the polymerization of colloid asphaltene on the catalyst, such that the velocity of adsorb-desorbs of the macromolecules in the catalyst. Meanwhile, dispersing the colloid asphaltene has a self-cleaning effect on the catalyst so as to delay the carbon deposition on the catalyst and lengthening the service time of the catalyst.

Adding hydrogenated high boiling point solvent and formulating the hydrogenated distillation fractions aim at the hydrogen transfer from the hydrogenated high boiling point solvent to asphaltene carried out under the catalytic hydrogenation conditions. Meanwhile, the hydrogenated high boiling point solvent, which is a mixture of the polycyclic aromatic hydrocarbon containing 1 to 3 $C_4$-$C_6$ cycloalkane structure, with a molecular weight of 150~280, has a function of reducing the concentration of the colloid asphaltene so as to reduce the demand for the catalytic hydrogenation conditions, and delay the carbon deposition on the catalyst.

Filtration mainly aims at ensuring that the impurity larger than 10 μm the tar which is not removed by the pipeline equipments of filter technology is filtrated out so as to protect the catalysts.

(II) Hydrorefining and Cracking

The hydrorefining raw materials are mixed with high pressure hydrogen, the mixture is heated and fed into hydrogenation protecting demetalization reactor and refining reactor to be catalytic hydrorefined, then the liquid phase components of the refined oil is mixed with the liquid phase components of the cracking product, and the mixture is fed into a fractionating system after being filtered.

Meanwhile, a part of hydrogenated high boiling point solvent fractionated by the vacuum distillation column of the fractionating system is used to remove salt and QI from coal tar and formulate hydrogenation feedstock, the rest is used as the raw material of catalytic hydrocracking together with the flash oil produced from the thermal polymerization of mesophase pitch.

(1) The Main Functions of the Hydrorefining Section a) QI is further removed from coal tar. On the preprocessing stage, though a mass of QI is removed, there is still some QI having particle size of 0.5-2 μm. When the preprocessed coal tar is just passed through the protecting catalyst, these QI will deposit in the channel on the surface of the protecting catalyst at a high temperature. QI is required to be removed on the initial stage of refining, though the abovementioned situation is going to be avoided by adding solvent in quantity.

b) Trace metal components such as Na, K, Mg, Ca, Fe, Cu, Al, V, Ni and so forth are removed, among which Na, Fe, V and Ni should be paid particular attention, since most of the other metal components are removed during the preprocessing stage except Na and Fe which will form metal complexes, and the removal thereof requires demetallization catalyst. There is very little V and Ni contained in coal tar, thus they have no obvious effect on the catalyst.

c) Impurity atoms such as O, N and S are removed from the function groups of the macromolecules.

d) The reactivity of molecules can be reduced by hydrogenation saturations of the side chain of macromolecule and the molecules easy to be polymerized to form a methyl side chain; the aromatic ring of the polycyclic aromatic hydrocarbon portion will be cycloalkylated promoting the formation of cycloalkane structure; meanwhile, a hydrogen transfer will be carried out in the presence of the hydrogenation solvent so as to promote the alteration of the molecular structure, to form a hydrogenated pitch the molecular structures and composition of which are consistent with the requirements for the preparation of mesophase pitch.

e) Since the hydrogenation and dehydrogenation of the hydrogenation solvent is reversible, the hydrorefining in the presence of the hydrogenation solvent is in favour of the increase of the hydrogen content in the molecule structure of pitch.

f) After hydrogenation of the QI-free coal tar components, due to the saturated molecular structure thereof, the low boiling point components in pitch are easier to be separated rather than to be polymerized when being distilled, which leads to a narrower molecular weight distribution of the hydrogenated pitch for preparation of mesophase pitch.

g) The cycloalkane and methyl side chain structures contained in the molecules are beneficial to the group components of hydrogenated pitch becoming soluble along with a small change in molecular weight. Because the cycloalkane and methyl side chain structures contained in pitch molecules are beneficial to the gather of mesophase spheres, the demand for molecular weight distribution of the hydrogenated pitch is relaxed. The large molecules become soluble, and smaller molecules also take part in the reaction due to having the cycloalkane and side chain structures to form much more cata-condensation polycyclic aromatic hydrocarbon. Meanwhile the softening point of mesophase pitch is lowered and the formation of soluble mesophase pitch is facilitated.

(2) The Main Function of Hydrocracking Section a) Hydrocracking refined oil components of 300-360° C. and flash oil produced by thermal polymerization of mesophase pitch to make the high boiling point fractions be further ring-opening and bond-broken, to make the aroma-hydrocarbons structures of the macromolecules to form more cycloalkane structures and methyl side chain structures, to increase the H/C ratio of the solvent oil, to further remove S and N, and to produce the hydrogenated high boiling point solvent meeting the requirements.

b) After hydrocracking, most of components (of about 50%-70%) are converted to be gasoline and diesel blending components, and the rest cracking fractions with a boiling point higher than 300° C. together with refined fractions of 300-360° C. are used as hydrogenated high boiling point solvent.

(3) The Index Required by Hydrorefining a) Since hydrofined oil has complex components, the refining catalyst is required to have appropriate hydrogenation ability. An excessive hydrogenation will destroy the molecular structure of the effective components leading to a reduced yield of mesophase pitch, and is very demanding on the catalyst leading to a high cost of refining;

b) The rate of desulphurization is about 70-90%, and the sulfur contents in the hydrogenated pitch should be less than 0.2%; the rate of denitrification is about 50-90%, and the nitrogen content in hydrogenated pitch should be controlled to be less than 0.3%; the rate of deoxygenation is about 50-90%, and the oxygen content in hydrogenated pitch should be controlled to be less than 0.3%;

c) Na content is less than 10 ppm; Fe content is less than 10 ppm; the total metal ions content is less than 50 ppm;

d) The change of H/C ratio of hydrogenated pitch is a major sign of hydrogenation effect. As compared with cleaned pitch, a 20% increase in H/C ratio can satisfy the preparation of mesophase pitch. A higher H/C ratio of hydrogenated pitch is beneficial to the preparation of mesophase pitch, lowing softening point and increasing soluble components content. However, mesophase pitch having an excessively high H/C ratio will produce bubbles when being spun, which results in fiber broken.

(4) The Hydrorefining Conditions

The operating conditions of the hydrorefining reactor are: the total pressure is 12.0 MPa-20.0 MPa, the average reaction temperature is 320° C.-400° C., the liquid hourly space velocity is 0.5 $hr^{-1}$-2.0 $hr^{-1}$, and the suitable hydrogen-oil volume ratio is 600:1-1500:1. The conditions are illustrated respectively as follow:

a) The Temperature

The requirement of an effective hydrogenation of pitch is heating pitch to a temperature that is sufficient for thermal decomposition of pitch. At this temperature, pitch molecules are cracked, wherein some unstable molecules will be cracked into molecular fragments having free radical property. These active free radicals obtain hydrogen atom from hydrogen in the presence of catalyst or from hydrogenation solvents, such that the free radicals is stabilized by being saturated to form hydrogenated pitch having optimized molecular structure so as to achieve the aim of hydrogenating cleaned pitch effectively.

The pitch molecules are cracked more obviously and obtain hydrogen atoms effectively at a temperature of 400-420° C. However, the cracking effect will get poor at a temperature higher than the above temperature with a side-effect that the active pitch molecules are easy to be polymerized to form a carbon deposition on the catalyst, affecting the catalyst activity. At this time, the side-reaction becomes a major reaction instead of hydrogenation. Under the catalysis conditions, the cracking temperature of pitch molecules will be reduced significantly, so a desired range of temperature should be controlled within 320-400° C., so as to avoid the temperature from being higher than 400° C. When the temperature is lower than 390° C., the carbon deposition on catalyst will be delayed so as to protect the catalyst and lengthen the service life thereof. When the temperature is too low (<300° C.), organic sodium compounds are unable to be effectively decomposed and removed, and the pitch molecules cannot be activated to form free radicals.

b) The Partial Pressure of Hydrogen

The pressure in the refining reactor should be controlled to be 12.0-20.0 MPa. A properly increased hydrogen partial pressure can enhance the refining effect, slow the speed of coking on the catalyst, and lengthen the service life of the catalyst.

c) The Volumetric Space Velocity

An excessively high volumetric space velocity leads to a poor hydrogenation effect, and requires a high catalyst activity, while an excessively low volumetric space velocity results in a long reaction time, a low load, and an increased probability of carbon deposition on catalyst. A suitable volumetric space velocity should be controlled within 0.5-2.0 $hr^{-1}$.

d) Hydrogen-Oil Ratio

Based on the chemical hydrogen consumption required by the extent of refining reaction, 600-1500:1 is preferred.

(5) Catalyst

Hydrogenation feedstock is a preprocessed decant oil the impurities of which such as quinoline insoluble fraction and the like are removed, or formulated hydrogenation feedstock from which the carbolic oil and naphthalene oil are taken. Although most of the impurities are already removed in the preprocessing stage, there is still a small amount of impurities including metal ions, quinoline insoluble fraction and the like, which are apt to deposit on the outside surface and pores inside of the catalyst during hydrogenation. Moreover, unsaturated olefins and thermal instable macromolecules contained in tar, especially heterocyclic compounds, are main substances of carbon deposition due to their high activities. They can easily coke under heating and deposit on the surface of the catalyst resulting in the channel of the catalyst jamming and catalyst deactivation.

The metal ions such as organic iron, organic calcium and the like contained in coal tar affect both hydrorefining and hydrocracking catalysts. The hydrogenation of oil soluble organic iron is very fast. For the routine microporous catalyst, iron sulfide is mainly deposited on the catalyst particles or spreads on the surface of the catalyst in circularity, and is unable to move. The increased iron deposit amount just appears at the increase of the deposition thickness of iron on the surface of the catalyst, but the deposited iron will not permeate into the catalyst. Therefore, It can be deemed that the iron sulfide deposition mainly influences on the surface of the catalyst, and has little effect on the pore volume of the catalyst. However, once the iron deposit amount increases to a certain degree, the catalyst particles would be bonded together, while a hard shell would be formed on the surface thereof, which would result in increased bed pressure drop and reduced catalyst utilization. Therefore, the design of demetalization catalyst is required to have macropores and high bed voidage.

Similar to the organic iron salts, organic calcium salts are easy to be removed. In general, the hydrogenation activity components of catalyst are not required, and the reaction process is mainly the thermal cracking. The removed calcium is preferred to deposit on the outer surface of the catalyst particles and to form larger grains. Therefore, the decalcification reaction carried out by hydrogenation decalcification protectant should be mainly in the protectant bed with most of calcium deposited in the pore canals of the demetalization catalyst so as to ensure the bed pressure drop will not increase or increase within a narrow range.

Organic sodium salts are present in the forms of sodium phenate and sodium napthionate, and have a great influence on catalyst deactivation, and also affect the quality of mesophase pitch at the same time.

In order to ensure the long-term stable operation of the equipment, protecting catalyst and demetalization catalyst should be loaded prior to the primary catalyst to remove deposition and metal ions in the raw material, so as to achieve the purpose of protecting the primary catalyst. Two reactors equipped with hydrogenation protectant and demetalization catalyst can be connected in parallel, wherein the hydrogenation protecting catalyst is loaded in the top reactor, while the demetalization catalyst is loaded in the bottom reactor, for the convenient switch.

The carbon deposition on the primary catalyst is reduced by passing the raw material for hydrogenation through hydrogenation protection and demetalization catalysts, while gaseous hydrogen with high partial pressure in the refining catalyst can partially inhibit the carbon deposition of the high boiling point components in coal tar. However, the carbon deposition still cannot be completely avoided in the long run. The reason is coal tar contains a trace of olefins and a amount of colloid and asphaltene, and the pyrolysis of these substances is apt to generate active free radicals which easily condensate to produce carbon deposition depositing on the catalyst jamming the bed, causing increase of the catalyst bed pressure drop. In this case, these active free radicals would be stabilized if hydrogen molecule or atom exists, such that the carbon deposition would be inhibited and alleviated. Increasing the partial pressure of hydrogen can significantly enhance the concentration of the active hydrogen atoms, but the investment and the operation costs will be increased significantly at the same time.

One of the effective means is to add solvent for dispersing colloid and asphaltene, such as hydrogenated distillation fraction, hydrogenated high boiling point solvent, BTX Fraction and the like generated in the process of the present application. Besides supplying active hydrogen atoms, these liquid hydrogen-donor solvents can promote the transition of gaseous hydrogen into the liquid phase, and accelerate the hydrogenation rate. Meanwhile, the viscosity of the reaction mass is reduced, colloid asphaltene molecules are dispersed, the rates of absorption and desorption are enhanced, and carbon deposition is reduced, such that hydrorefining reaction can be carried out smoothly. In addition, in the presence of hydrogen-donor solvents, the requirements for refining reaction condition can be lowed, and the degree of hydrorefining reaction can be better controlled, avoiding some of the macromolecules being excessively cracked into small molecules resulting in a reduced yield of the pitch products. The formulation of the components having low boiling point such as BTX Fraction and the like mainly reduce the viscosity and density of the hydrogenation feedstock, and disperse colloid asphaltene to make it difficult to be polymerized to form micelle depositing on the catalyst, so as to enhance the absorption and desorption rates on the catalyst, which is in favor of the desorption of the macromolecules from the catalyst and has a self-cleaning effect to the catalyst. As described earlier, the coking problem of catalyst can be inhibited well by adding the BTX Fraction, wash oil, hydrogenated low boiling point fraction and hydrogenated high boiling point solvent generated in the process of the present application, such that the service life of the catalyst can be lengthened.

Compounds with heteroatoms such as S, N, O and the like contained in coal tar affect the nucleation, growth and conversion of mesophase sphere, and adverse to the formation of thin fibrous or needlelike structures. For example, sulphur is a strong dehydrogenating agent which accelerates the dehydrogenated condensation of aromatic hydrocarbons, and is in favor of the appearance of mesophase sphere; meanwhile, sulphur is also a cross-linking agent, which makes the molecules lose the planarity and form a cross-linked structure, resulting in an increased viscosity. This is adverse to mesophase sphere growing, gathering and being transformed into being in an anisotropic structure, and instead, the mesophase sphere is transform into being in a mosaic structure.

It would be very advantageous for the formation of the mesophase that a certain amount of cycloalkane structure and aliphatic short side chains are contained in the coal tar pitch molecules. This is because transfer of hydrogen radical in cycloalkane happens during the pyrolysis process, by which the reactivity of free radicals can be stabled effectively, fluidity and solubility of the mesophase product can be remained so as to arrive at an extensive optically anisotropic texture.

The main functions of the hydrorefining catalyst here are: to remove the heteroatoms such as S, N, O and the like contained in coal tar; to hydrogenate the unsaturated components and make them saturate to form polycyclic aromatic hydrocarbon with cycloalkane structure; to break the side chain of the active aromatic hydrocarbon with longer alkyl side chain in the raw material to from more stable aromatic hydrocarbon with short side chain; and meanwhile to supply hydrogen to hydrogen-donor solvent in the presence of hydrogen to arrive at the timely regeneration of the hydrogen-donor solvent, to promote the gaseous hydrogen to convert to liquid phase timely, and to accelerate the hydrogenation reaction.

Therefore, refining catalyst is characterized by: suitable pore volume and pore size, large deposition tolerance, and suitable reactivity. Catalytic hydrorefining also can be carried out in the presence of other catalysts with strong refining and weak cracking activities and suitable pore volume and pore size.

According to the characteristic of hydrogenation of coal tar, in order to ensure the stable operation of hydrogenation, the excessively high catalytic performance and excessively long service life of catalyst cannot be placed undue emphasis on (which also cannot be insisted on). Of course, the service lives of various catalysts are different.

(III) Preparation of the Mesophase Pitch

1) Preparation of Hydrogenated Pitch

After being filtered, a mixture of hydrofined oil and cracking product is fed into distillation column to separate low boiling point naphtha components, water and acidic gas, and then the mixture is fed into an ordinary pressure distillation column Gasoline blending component distilled from the top of the ordinary pressure distillation column is passed into a gasoline blending component storage tank as a product, diesel blending component distilled from the middle part is passed into a gasoline blending component storage tank, and the bottom high boiling point component is passed into a vacuum distillation column after being heated. Hydrogenated high boiling point solvent and hydrogenated pitch are separated from the vacuum distillation column, wherein a part of the hydrogenated high boiling point solvent is used as the solvent for removing salts and QI from coal tar and a formulated component of hydrogenation feedstock, and the rest is used as the feedstock of the hydrogenating cracking reactor. The hydrogenated pitch is extracted by solvents for a further removal of impurities prior to being fed into a reaction still to obtain a mesophase pitch product through thermal polymerization. Oil gas from the top of the reaction still is discharged after being cooled, separated and washed. The separated flash oil is passed into cracking feedstock tank as a raw material for hydrocracking.

(1) Filtration

Setting a filter prior to the distillation column to filter refined oil and cracking product and remove catalyst particles.

The analysis of QI obtained from preprocessing coal tar by the laser particle analyzer shows that QI in coal tar is normally distributed within 0.3-1 µm. Through elemental analysis, these primary QI with small particle size are mainly free carbon and other inorganic substance with particle sizes greater than 0.3 µm.

The refined oil is standing for a long time to obtain deposit which is then filtered by a filter screen of 500 mesh. There is very little residue in the filter screen, and the analysis results of the element analysis and laser particle size analyzer indicate that the residues are mainly catalyst particles with a particle size greater than 30 µm.

After being filtered by filter screen of 500 mesh, the filtered oil is subjected to suction filtration by filter funnels buehners of 2-5 µm, 5-10 µm and 10-15 µm respectively. All of the filtered oil passes through the 10-15 µm filter funnels buehner, while residues are left on other two filter funnels buehners. Quinoline, toluene and n-heptane are used to dissolve the above residues respectively, wherein the residue is substantially insoluble in n-heptane, partially soluble in toluene, and is soluble in quinoline, which further indicate that the residues are toluene-insoluble and quinoline-soluble fractions (TI-QS), and are macromolecular hydrocarbon polymer.

A filter with a bore diameter of 10-25 µm is used to remove the catalyst powder because of the high temperature of hydrorefining oil and cracking product and the low viscosity of the liquid phase. Two groups of the operation of filtering the components with sintering metal can be carried out in parallel, and the number of the filter groups can be selected according to flow. The fraction oil of 120-180° C. from the ordinary pressure distillation column or BTX Fraction and wash oil are used as the steeping and backwashing solvent.

(2) Distillation

Distillation unit is set up with distillation column, ordinary pressure distillation column and vacuum distillation column. The filtered hydrogenated oil mixture is fed into distillation column firstly to separate naphtha (<120° C.), water and acidic gas, and then is fed into a ordinary pressure distillation column. The gasoline blending component (120-180° C.) fractionated from the top of the ordinary pressure distillation column is passed into a gasoline blending component storage tank as a product. The diesel blending component (180-300° C.) fractionated from the middle part of the ordinary pressure distillation column is passed into a diesel blending component storage tank. The high boiling point components from the bottom is fed into vacuum distillation column after being heated. Hydrogenated high boiling point solvents with boiling spread of 300-360° C. and hydrogenated pitch with a boiling point higher than 360° C. are separated in vacuum distillation column (3) Extraction of Hydrogenated Pitch Hydrogenated pitch is extracted at a temperature of 120-180° C., using toluene, quinoline, pyridine or tetrahydrofuran as a solvent with a ratio of hydrogenated pitch to the solvent oil of 1:5-10. The extracted oil is filtered by using a metal filter of 5-10 µm, and then the extraction solvent and the extracted hydrogenated pitch are separated through distillation.

2) Preparation of Mesophase Pitch

Preparing mesophase pitch from hydrogenated pitch is a controllable thermal treatment process. Thermal treatment processes in common use are inert gas bubbling thermal treatment, and compressed or decompressed thermal heat treatment. The principle of all the above processes is thermal processing the raw material pitch in a polymerizer at a certain temperature and pressure for a certain time to conduct thermal polymerization to make the indexes of pitch meet the desired quality requirements.

The main operational factors are: start temperature, finishing temperature, rate of temperature increase, constant temperature time, stirring rate, pressure of inert gases, inert gas flow and the like. These factors are needed to be determined based on the character of the hydrogenated pitch. The analysis for the effects on the process from the above factors is as follows.

(1) The Influence of Temperature

The synthesis temperature is within a range of 380-460° C., and the constant temperature time is 180-1200 min, preferably 400-440° C., 180-600 min A slow rate of temperature increase is beneficial to the growth and gather of mesophase sphere to obtain mesophase pitch having a large region of anisotropism and good rheological property. The methods of reacting at a high temperature for a short time and then at a low temperature for a long time and the like also can be used.

(2) The Influence of Pressure

Increasing the thermal processing pressure can inhibit the rapid escape of the fraction having low molecular weight and increase carbonization degree. Meanwhile, the fraction having lower molecular weight coacervate in the liquid phase to improve the viscosity and the fluxionality, so as to facilitate the gather of mesophase sphere and the rearrangement of crystals to enhance the degree of anisotropism, but a excessive high pressure is a hindrance to the gather of mesophase sphere. The pressure-reduced thermal treatment can speed up the synthetic reaction.

(3) The Influence of System Stirring Situation

The stirring during preparation not only can maintain homogeneity of various components in the reaction system during the formation of mesophase, improve the intermiscibility of the mesophase pitch and mother liquor pitch, increase fluidity, and make the structure of formed mesophase more uniform, but also inhibit premature gather of the mesophase sphere at the beginning of the mesophase formation, and promote the formation of mesophase in the system at the late stage of the progress.

Since mesophase pitch has a higher molecular weight, excessive disturbance in the system causes an increased complexity of the inner structure of pitch which is bad for the formulation of domain anisotropy.

(4) Gas Purging

An inert gas stream is utilized to purge at the top and bottom of the reaction still, and the light components are purged out of pitch. The range of the molecular weight of the resulted mesophase pitch is narrower, and aromatic hydrocarbon components having proper molecular weight can be gathered to form a mesophase having a certain solubility and exhibiting anisotropism. In addition, the stirring of airflow can make the flat aromatic hydrocarbon molecules be arranged parallel to the airflow direction, which is beneficial to the gather of mesophase spheres.

(5) The Online Analysis of the System Viscosity

During preparation of mesophase pitch, besides the factors such as temperature, pressure and the forth, a method of online viscosity measuring is employed in the design, which can make a comparison of the actual viscosity-temperature curve and the theoretical viscosity-temperature curve to check the preparation degree.

The advantages of the invention over the prior art are as follows:

The invention produces mesophase pitch from coal tar as a raw material and employs self-made demetalization catalyst, hydrorefining catalyst and hydrocracking catalyst suitable for the inherent characteristic of coal tar. The advantages are ease of controlling the degree of hydrogenation, complete removal of impurities, good fluidity of the raw materials, not tending to create carbon deposition and coking during the technique process, and not tending to jam the reactor.

The main aromatic solvents used as the solvents for removing QI insoluble and the hydrogenated high boiling point solvent used as the hydrogenation solvent in the hydrogenation in the invention are self-generated in the manufacturing technique of the invention. Both of the solvents above have a good effect of removing impurities, a good hydrogen supply ability and a low cost, and are easy to be produced continuously.

The principal product of the present technology is mesophase pitch, a good precursor of carbon material having high value-added. Meanwhile, the byproducts are gasoline and diesel blending components, carbolic oil, crude naphthalene. The mesophase pitch has a low production cost, a simple processing, a low level of requirements to the equipments, a easily controllable process parameters and a cost efficient and reasonable whole process.

The invention will be further illustrated through Examples below. It can be appreciated that, the Examples below are optimization of the invention, which are only used to illustrate the invention without limitation. Other combinations and various modifications can be made within the concept of the invention without deviating from the intention or scope of the invention.

If not specified in the context herein, all of the percentages are percentage by weight.

The reagent used herein are chemically pure reagent purchased from Damao chemical reagent factory in Tianjin, and the high-temperature coal tar used herein comes from Anshan iron and steel group.

The following instruments are used in product characterization herein respectively: infrared spectrometer (FT-IR 430, JASCO), NMR (AVANCE II 400, Bruker in Swiss), elemental analyzer (vario EL III, Elementar company in Germany), GC-MS (HP 6890GC/5973MSD, Hewlett Packard in USA), polarizing microscope (XP-600E, Changfang Optical Instrument co., LTD, Shanghai, China), ion chromatograph (ICS-90, Dionex, USC), vapor pressure osmometer (K-7000, Knauer GmbH, German), ICPAES (Optima 2000 DV, Perkin Elmer Company, USA), chemical adsorption apparatus (CHEMBET 3000, Conta in USA), Automatic specific surface area and micropore physical adsorption analyzer (ASAP 2020, Micromeritics Instrument Corp), and X-ray fluorescence (XRF-1800, Shimadzu in Japan).

EXAMPLE 1

Figure 2:
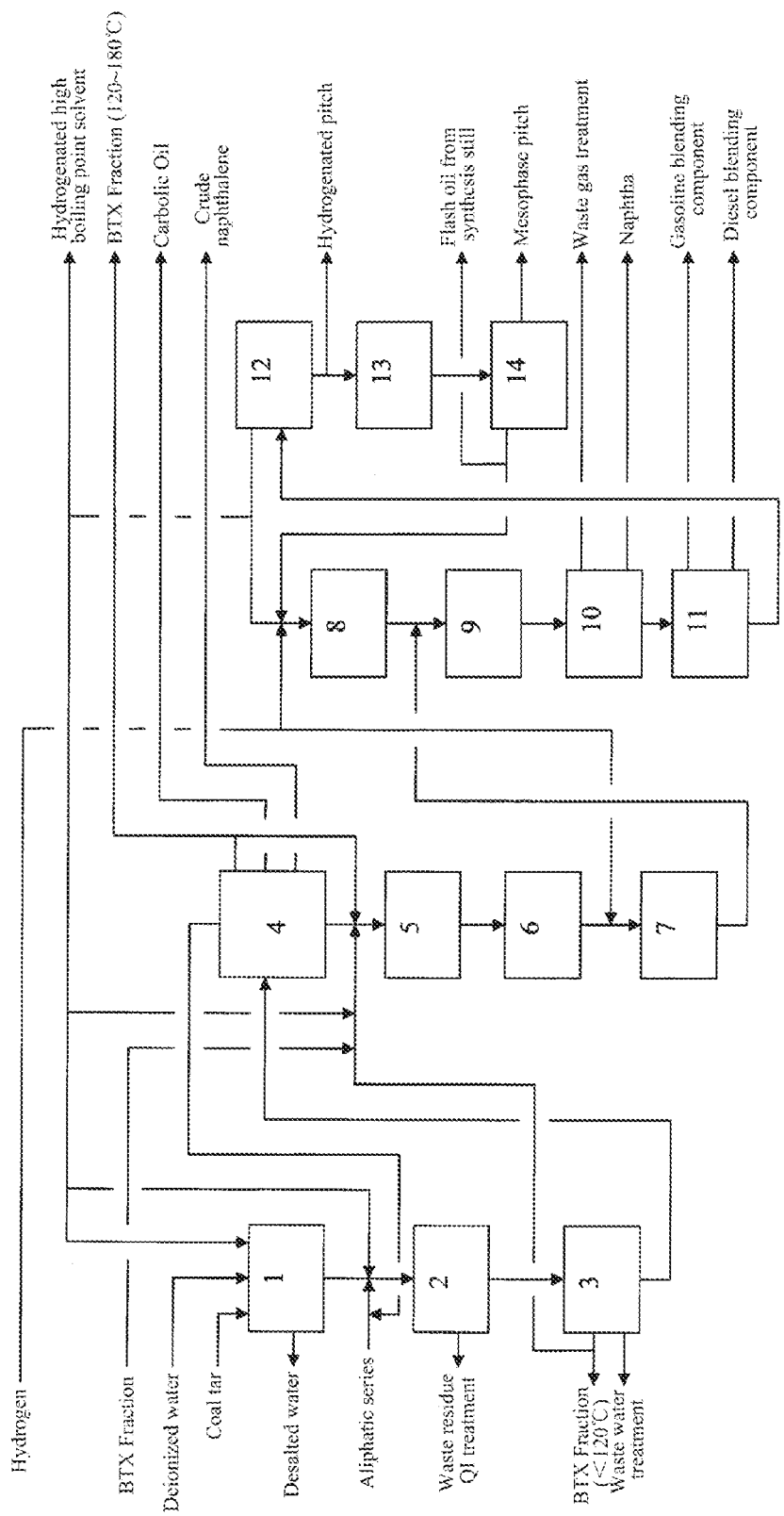
FIG. 2 is a flow chart of the detailed embodiments of the invention.

Referring to FIG. 2, the coal tar from the coal tar storage tank, deionized water and hydrogenated high boiling point solvent are fed into desalination section (1), sufficiently mixed, and then centrifuged to remove the washing waste water, to obtain a desalted coal tar having a $Cl^-$ content of less than 5 ppm. The waste water is fed into a waste water regeneration system. The desalted coal tar is fed into QI-removing section (2) after being mixed with aliphatic solvent (n-octane) and hydrogenated high boiling point solvent. After centrifugation and sedimentation to reduce the concentration of QI to 500 ppm, a decant oil is obtained. The QI is fed into a waste residue treatment system. After being heated, the decant oil is fed into a one-stage evaporator (3) to remove water and BTX Fraction (<120° C.). After being heated, the water-free decant oil is fed into distillation column (4) to be pre-distilled to recover the aliphatic solvent, and to separate BTX Fraction (120-180° C.), carbolic oil and naphthalene oil. The aliphatic solvent is routed back to the QI-removing section (2) for recycling use. The residues of distillation column (4), BTX Fraction (<120° C.), BTX Fraction (120-180° C.), hydrogenated high boiling point solvent and other low boiling point oils are mixed prior to being fed into mixer (5) to formulate the viscosity and density of the mixed hydrogenation feedstock. After filtered by filter (6), the formulated hydrogenation feedstock is mixed with hydrogen and then is fed into a protection demetalization and refining reactor (7) packed with protecting catalyst, demetalization catalyst, refining catalyst A and refining catalyst B to be catalytic hydrorefined. Refined liquid-phase component and the liquid-phase component from the cracking reactor (8) (the top of which is packed with cracking catalyst, and the bottom is packed with refining catalyst B) are mixed and passed through filter (9). After being filtered, the mixture is passed into distillation column (10) to separate naphtha, water and acidic gases. The bottom oil of the distillation column is heated and passed into ordinary pressure distillation column (11) to separate gasoline and diesel blending components. The bottom oil of ordinary pressure distillation column is reheated and passed into vacuum distillation column (12) to separate hydrogenated high boiling point solvent and hydrogenated pitch. The hydrogenated high boiling point solvent is used for the removal of salts and QI from coal tar and the formulation of the feedstock, and the rest together with the flash oil from the synthetic reaction still are mixed with hydrogen, and then fed into the cracking reactor (8). The hydrogenated pitch is extracted via extraction section (13) to obtain an extracted hydrogenated pitch, which is fed into synthetic reaction still (14) to be subjected to thermal polymerization to synthesize a mesophase pitch.

The high-temperature coal tar as shown in Table 1-1 is sufficiently mixed with hydrogenated high boiling point solvent with a boiling point higher than 300° C. and deionized water in a volume ratio of 1:0.5:0.5 and enters into a centrifuge after being washed to remove most of washing water therein, and the washing is repeated 3 times. The hydrogenated high boiling point solvent is obtained by hydrorefining BTX Fraction and anthracene oil in a ratio of 0.4:1 under the catalyst and the hydrorefining conditions of this example as shown in Table 1-2. The washed coal tar is passed into a tank for the removal of QI, and n-octane is added to adjust the volume ratio to be: tar:hydrogenated high boiling point solvent:n-octane=1:0.5:0.5. After stirring, the mixture is passed into a centrifuge to remove QI to obtain purified decant oil. The conditions of the above operations are a temperature of 80° C., a stirring rate of 120 rpm, a stirring time of 5 min, and a centrifugal rate of 4000 rpm. Distill part of the decant oil to obtain cleaned pitch, and see Table 1-3 for the analysis results of decant oil and cleaned pitch. The rest of the decant oil is processed by a distilling apparatus to separate water, BTX Fraction of lower than 120, n-octane, BTX Fraction of 120-180, carbolic oil and naphthalene oil. The oil mixture of residue, BTX Fraction of lower than 120 and BTX Fraction of 120-180 is mixed with an additional BTX Fraction in a ratio of 1:0.4 to obtain a hydrogenation feedstock.

Hydrorefining and cracking reaction are carried out in a set of continuous hydrogenation reaction apparatus with two reaction tubes. The two reaction tubes of 200 ml which can be used in series or in parallel are put in a fixed furnace. Moreover, the two reaction tubes share one set of feeding system and cooling separation system, and are operated by one computer for automatic control and monitored control. The first reaction tube loaded with protecting and demetalization catalysts and the second reaction tube loaded with refining catalyst A and refining catalyst B are used in series to carry out the hydrorefining reaction. When hydrocracking reaction is required, the above two tubes are replaced by a reaction tube of 200 mL loaded with cracking catalyst and refining catalyst B, which is used alone on the apparatus for the reaction.

The hydrogenation feedstock from a hydrogenation feedstock tank is heated to 80 prior to being filtered by metal filter. The heated and filtered hydrogenation feedstock is mixed with hydrogen and passed into a reactor packed with hydrogenation protecting catalyst and demetalization catalyst TJS1 shown in Table 1-4 for the further removal of impurities and metal ions. Then the product of the above process is passed into a reactor which is loaded with hydrorefining catalyst JZ1 shown in Table 1-4 in its top, and refining catalyst JZ6 shown in Table 1-4 in its bottom to be subjected to hydrorefining. The operation conditions for hydrorefining reaction are a total pressure of 16.0 MPa, an average reaction temperature of 350, a liquid hourly space velocity of 1.0 hr$^{-1}$ and a hydrogen-oil volume ratio of 1000:1.

The fraction of 300-360 obtained from the distillation of refined oil is used as a raw material which is fed into a hydrocracking reactor packed with cracking catalyst LH1 shown in Table 1-5 in its top and refining catalyst JZ6 in its bottom to carry out a hydrocracking reaction to obtain a cracking product. The operation conditions are a total pressure of 16.0 MPa, an average reaction temperature of 370, a liquid hourly space velocity of 1.0 hr$^{-1}$, and a hydrogen-oil volume ratio of 1000:1.

Figure 3A:
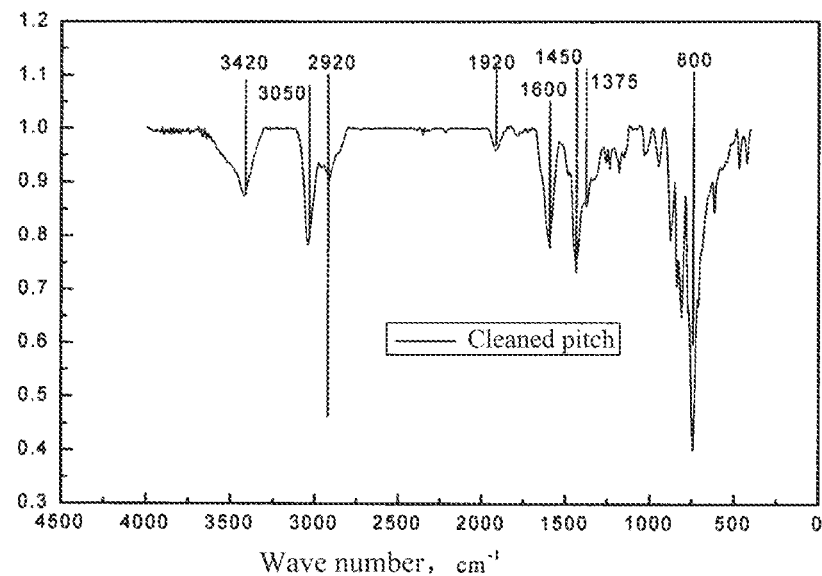
FIGS. 3A and 3B show the IR spectrograms of the cleaned pitch and hydrogenated pitch obtained in Example 1, indicating that after the hydrogenation, the hydrogenated pitch still maintains a higher aromaticity, and the structural units thereof also comprise a high level of alkyl side chains and cycloalkane structures which make the hydrogenated pitch to more tend to be in the form of domain anisotropy.
Figure 3B:
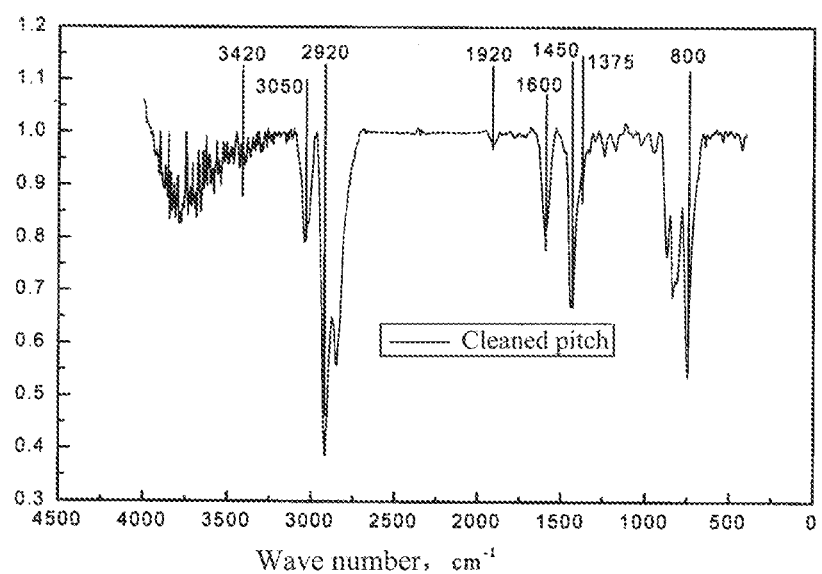
Figure 4:
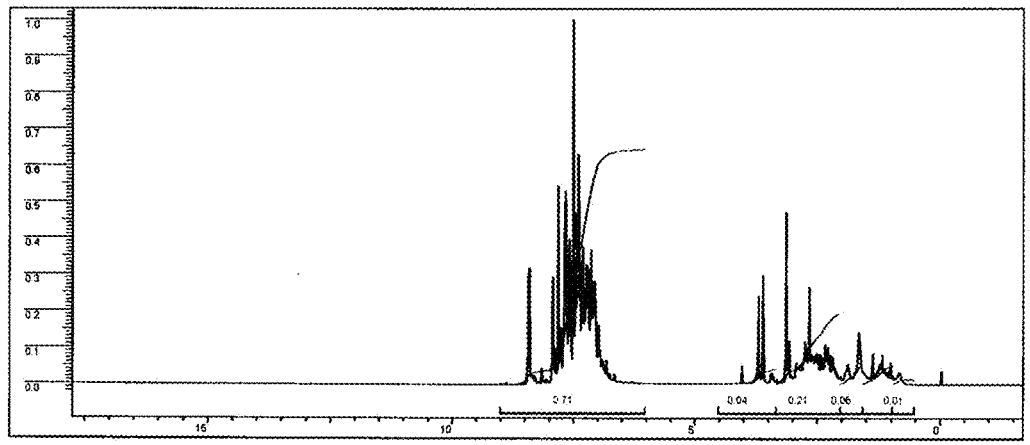
FIG. 4 shows the H NMR spectroscopy of the hydrogenated pitch obtained in Example 1.

Hydrofined oil is mixed with the cracking product in a ratio of 1:0.35 prior to being filtered. The operation pressure of the filter is 0.2 MPa, the temperature is 200, and the absolute filtering precision is 10 μm. The filtered oil is processed by an ordinary pressure distillation apparatus to separate water, naphtha components with a boiling point lower than 120, gasoline blending component of 120-180 and diesel blending component of 180-300, and then passed into a vacuum distillation apparatus. The fraction with a boiling spread of 300-360 is used as hydrogenated high boiling point solvent and a raw material for hydrocracking, and the fraction with a boiling point higher than 360 is hydrogenated pitch. The analysis of distillation fractions is shown in Table 1-6, and the analysis of hydrogenated high boiling point solvent is consistent with the analysis result shown in Table 1-2. The analysis of hydrogenated pitch is shown in Table 1-7, and the infrared spectroscopy and NMR analysis of the hydrogenated pitch are shown in FIG. 3B and FIG. 4.

The hydrogenated pitch shown in Table 1-7 is extracted in a soxhlet extractor by using pyridine, and the obtained extracted oil is separated by a rotary evaporator to obtain extracted hydrogenated pitch. The analysis results are shown in Table 1-8.

The extracted hydrogenated pitch is passed into a reaction still to obtain a mesophase pitch product through thermal polymerization. The oil gas from the top of the reaction still is vented after being cooled, separated and washed, and the separated flash oil is used as a cracking feedstock component. The synthesis conditions of reaction still are: ordinary pressure, a temperature of 430, a reaction time of 300 min, a stirring rate of 30 rpm and with nitrogen purging at the bottom of the reaction still. The analysis of the separated flash oil is shown in Table 1-9, and the analysis of mesophase pitch is shown in Table 1-10.

TABLE 1-1

| A fundamental analysis of coal tar | | | | |
|---|---|---|---|---|
| | Analysis items | Units | coal tar | |
| Conventional analysis | Water | wt % | 1.41 | |
| | Density @20° C. | g/cm³ | 1.14 | |
| | Dynamic viscosity @80° C. | CP | 27.7 | |
| | TI | wt % | 8.09 | |
| | QI | wt % | 3.12 | |

TABLE 1-1-continued

| A fundamental analysis of coal tar | | | |
|---|---|---|---|
| | Analysis items | Units | coal tar |
| Elemental analysis | C | wt % | 90.80 |
| | H | wt % | 5.25 |
| | N | wt % | 0.99 |
| | S | wt % | 0.51 |
| | O | wt % | 2.45 |
| Metal ions | Al | ppm | 43.1 |
| | Ca | ppm | 35.4 |
| | Fe | ppm | 21.7 |
| | Mg | ppm | 6.5 |
| | Na | ppm | 0.6 |
| | K | ppm | 1.0 |
| | Ni | ppm | 0.4 |
| Anions | Cl⁻ | ppm | 57 |

TABLE 1-2

| Analysis of hydrogenated high boiling point solvent | | | | | | | |
|---|---|---|---|---|---|---|---|
| Distillation range | Density @ 20 g/cm³ | Dynamic viscosity @ 20 CP | C wt % | H wt % | O wt % | N wt % | S wt % |
| 300-360 | 0.99 | 55.7 | 89.17 | 9.5 | 0.51 | 0.70 | 0.12 |

Typical molecular structures obtained from GC-MS analysis

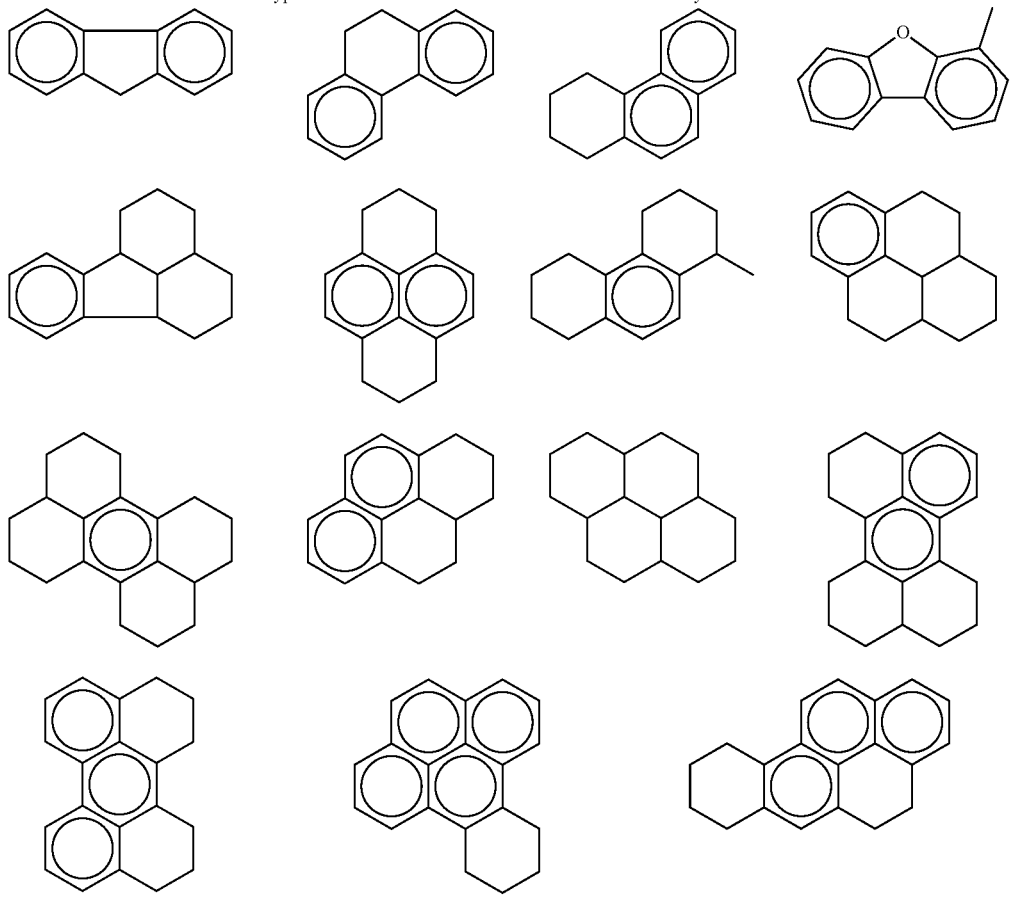

TABLE 1-3

Properties of decant oil and cleaned pitch

| | Analysis items | Units | Decant oil | Cleaned pitch |
|---|---|---|---|---|
| Conventional analysis | Water | wt % | 1.8 | — |
| | Density @20 | g/cm$^3$ | 1.09 | 1.27 |
| | Dynamic viscosity @20 | CP | 25.1 | — |
| | TI | wt % | 3.76 | 16.95 |
| | QI | wt % | 0.02 | 0.05 |
| Concentration of the anions | Cl$^-$ | ppm | 2.49 | — |
| Metal ions | Al | ppm | 8.7 | 19.4 |
| | Ca | ppm | 5.3 | 9.6 |
| | Fe | ppm | 10.4 | 20.8 |
| | Mg | ppm | 1.4 | 2.8 |
| | Na | ppm | 0 | 0 |

TABLE 1-4

Properties of the catalysts for dementalization and refining

| | Catalysts | | | | | |
|---|---|---|---|---|---|---|
| | Dementalization | | Refining A | | | Refining B |
| | TJS1 | TJS2 | JZ1 | JZ3 | JZ4 | JZ6 | JZ7 |
|---|---|---|---|---|---|---|---|
| Pore volume cm$^3$/g | 0.82 | 1.35 | 0.61 | 1.33 | 0.55 | 0.72 | 1.03 |
| Specific surface area m$^2$/g | 187.8 | 321.3 | 253.5 | 175.0 | 210.8 | 245.8 | 200.7 |
| Pore diameter nm | 12.1 | 21.2 | 11.0 | 18 | 8.9 | 7.8 | 10.3 |
| Acid content mmol/g | — | — | 0.095 | 0.070 | 0.055 | — | — |
| MoO$_3$ wt % | 15.4 | 8.1 | 32.9 | 26.3 | 39.0 | 15 | 21.4 |
| NiO wt % | 2.3 | 3.14 | 2.52 | 2.7 | 4.13 | 2.1 | 2.64 |
| P$_2$O$_5$ wt % | — | — | 2.4 | 1.7 | 2.9 | 1.5 | 1.6 |

TABLE 1-5

Properties of cracking catalyst

| | Cracking catalyst | | |
|---|---|---|---|
| | LH1 | LH2 | LH3 |
| Mesoporous molecular sieve content wt % | 13.8 | 10.6 | 14.3 |
| Microporous molecular sieve content wt % | 5.7 | 9.6 | 9.5 |
| Amorphous silica-alumina content wt % | 34.5 | 26.7 | 33.3 |
| Macroporous pseudo-boehmite content wt % | 46 | 53.1 | 42.9 |
| Pore volume cm$^3$/g | 0.56 | 0.89 | 0.35 |
| Specific surface area m$^2$/g | 310.5 | 248.5 | 341.8 |
| MoO$_3$ wt % | 33.4 | 32.1 | 16 |
| NiO wt % | 3.1 | 2.8 | 2.1 |

TABLE 1-6

Analysis of the hydrofined oil fraction

| | Refined oil fraction | | |
|---|---|---|---|
| | <120° C. | 120~180 | 180~300 |
| Composition (V %) | 16.0 | 8.7 | 25.5 |
| Density @20 | 0.824 | 0.851 | 0.954 |
| C/wt % | 88.93 | 89.17 | 89.25 |
| H/wt % | 10.35 | 10.02 | 9.58 |
| S/wt % | 0.11 | 0.03 | 0.03 |
| N/wt % | 0.30 | 0.45 | 0.56 |
| O/wt % | 0.31 | 0.33 | 0.58 |
| Initial boiling point ( ) | 68 | 82 | 106 |
| 10% (° C.) | 83 | 116 | 180 |
| 30% (° C.) | 88 | 129 | 250 |
| 50% (° C.) | 92 | 144 | 270 |
| 70% (° C.) | 100 | 168 | 289 |
| 95% (° C.) | 117 | 175 | 298 |
| Final boiling point (° C.) | 121 | 182 | 305 |

TABLE 1-7

Analysis and comparison of hydrogenated pitch and cleaned pitch

Group composition analysis (wt %)

| | HS | HI-TS | TI-PS | PI-QS | QI |
|---|---|---|---|---|---|
| Cleaned pitch | 27.19 | 55.86 | 12.62 | 4.28 | 0.05 |
| Hydrogenated pitch | 71.55 | 27.40 | 0.74 | 0.20 | 0.11 |

Elemental analysis (wt %)

| | C | H | O | N | S | H/C |
|---|---|---|---|---|---|---|
| Cleaned pitch | 92.09 | 4.74 | 1.51 | 1.14 | 0.52 | 0.62 |
| Hydrogenated pitch | 92.48 | 6.60 | 0.20 | 0.34 | 0.38 | 0.86 |

ICP analysis (ppm)

| | Al | Fe | Ca | Mg | Na | 总量 |
|---|---|---|---|---|---|---|
| Cleaned pitch | 19.4 | 20.8 | 9.6 | 2.8 | 0 | 52.6 |
| Hydrogenated pitch | 4.2 | 5.6 | 7.9 | 1.2 | 0 | 18.9 |

As listed above:
HS: heptane-soluble fraction;
HI-TS: heptane-insoluble toluene-soluble fraction;
TI-PS: toluene-insoluble pyridine-soluble fraction;
PI-QS: pyridine-insoluble quinoline-soluble fraction;
QI: quinoline-insoluble fraction

TABLE 1-8

The molecular weights of hydrogenated pitch and extracted pitch and the group composition analysis

|  | Hydrogenated pitch | | Extracted hydrogenated pitch | |
|---|---|---|---|---|
|  | Composition/wt % | Molecular weight | Composition/wt % | Molecular weight |
| HS | 71.55 | 267 | 71.62 | 268 |
| HI-TS | 27.40 | 332 | 27.56 | 345 |
| TI-PS | 0.74 | 587 | 0.82 | 565 |
| PI-QS | 0.20 | — | 0 | — |
| QI | 0.11 | — | 0 | — |
| Average value | — | 315 | — | 291 |
| Softening point | 83 | | 83 | |

TABLE 1-9

Analysis of flash oil from synthesis still

| Distillation range | Density @ 20 g/cm³ | Dynamic viscosity @ 80 CP | C wt % | H wt % | O wt % | N wt % | S wt % |
|---|---|---|---|---|---|---|---|
| 300-360 | 1.07 | 2.83 | 90.12 | 9.42 | 0.22 | 0.16 | 0.08 |

Typical molecular structures obtained from GC-MS analysis

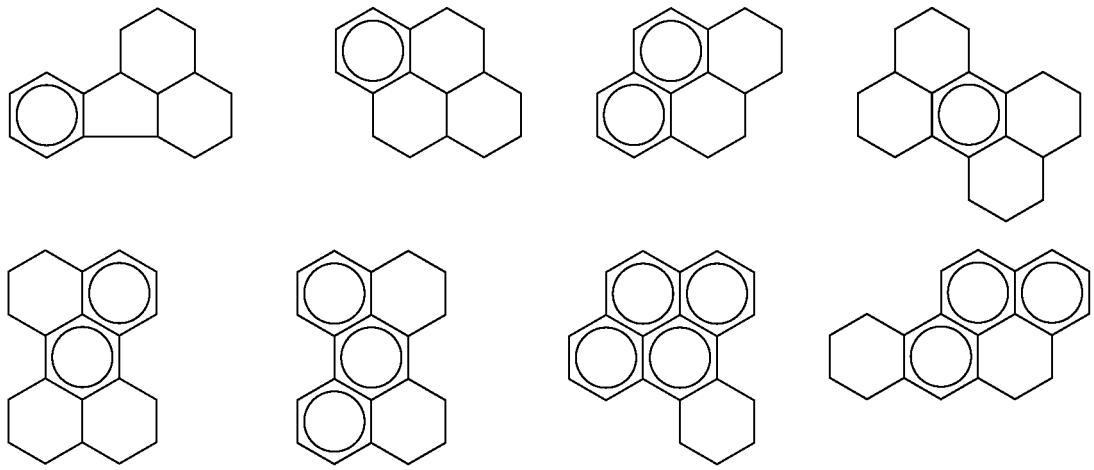

TABLE 1-10

Properties analysis of the mesophase pitch

| Mesophase pitch raw materials | Mesophase content (%) | Softening point ( ) | Ash content (ppm) | QI (%) | Density @20 (g/cm³) |
|---|---|---|---|---|---|
| hydrogenated pitch | 100 | 240 | 31 | 44.2 | 1.45 |
| Extracted hydrogenated pitch | 100 | 230 | 16 | 47.1 | 1.45 |

EXAMPLE 2

A decant oil is obtained by removing salts and QI in the hydrogenated BTX Fraction, hydrogenated wash oil and hydrogenated anthracene oil obtained from high-temperature coal tar shown in Table 1-1 with BTX Fraction, wash oil and anthracene oil under the hydrorefining conditions in Example 1, shown in Table 2-1.

TABLE 2-1

Analysis of the decant oil obtained from hydrogenated fraction of coal tar

|  | Aromatic solvent | | |
|---|---|---|---|
|  | Hydrogenated BTX Fraction | Hydrogenated wash oil | Hydrogenated anthracene oil |
| Density @20 (g/cm³) | 0.86 | 0.97 | 1.05 |
| C wt % | 89.56 | 89.71 | 89.92 |
| H wt % | 10.25 | 10.13 | 9.50 |
| O wt % | 0.04 | 0.02 | 0.14 |
| N wt % | 0.13 | 0.11 | 0.34 |
| S wt % | 0.02 | 0.03 | 0.10 |

TABLE 2-1-continued

Analysis of the decant oil obtained from hydrogenated fraction of coal tar

|  | Aromatic solvent | | |
|---|---|---|---|
|  | Hydrogenated BTX Fraction | Hydrogenated wash oil | Hydrogenated anthracene oil |
| The ratio of coal tar to aromatic solvent | 1:0.2 | 1:0.5 | 1:0.75 |
| The ratio of coal tar to water | 1:3 | 1:3 | 1:3 |
| Washing times | 1 | 1 | 1 |
| Tar:aromatic solvent:n-octane | 1:0.5:0.4 | 1:0.5:0.58 | 1:0.75:0.75 |
| Cl⁻ content in the decant oil (ppm) | 4.8 | 3.7 | 5.1 |
| QI content in the decant oil (ppm) | 125 | 187 | 231 |

TABLE 2-1-continued

Analysis of the decant oil obtained from hydrogenated fraction of coal tar

| | Aromatic solvent | | |
|---|---|---|---|
| | Hydrogenated BTX Fraction | Hydrogenated wash oil | Hydrogenated anthracene oil |
| Total content of metal ions in the decant oil (ppm) | 32.3 | 33.5 | 67.9 |
| Residues obtained from the predistillation of the decant oil | | | |

Separating fractions with a boiling point of less than 230 by distilling the above decant oil to obtain residues, and, which are formulated with BTX Fraction, hydrogenated fraction with a boiling point lower than 120 and hydrogenated high boiling point solvent respectively under the condition listed in Table 2-2, to obtain hydrogenation feedstock, and. Since residue obtained from the decant oil distillation is rich in hydrogenated high boiling point solvent, the hydrogenation feedstock may not need to be formulated with a hydrogenated high boiling point solvent.

TABLE 2-2

Formulation of the hydrogenated fraction of coal tar and the residues of decant oil The residues of decant oil

| BTX Fraction:hydrogenated fraction of <120° C.:hydrogenated high boiling point solvent:the residues of distilled decant oil hydrogenation feedstock | 0.2:0.4:0:1 | 0.2:0.5:0.5:1 | 0.4:0:0:1 |

Hydrogenation feedstock and are subjected to hydrorefing respectively in accordance with the steps of Example 1 using protecting catalyst and demetalization catalyst TJS2 and refining catalysts JZ3 and JZ7 shown in Table 1-4 under the following reaction conditions: a pressure of 18 MPa, a temperature of 350-355 in the top of the reactor, a temperature of 340-345 in the bottom of the reactor, a space velocity of 0.8 $hr^{-1}$ and a hydrogen-oil ratio of 800:1, to obtain refined oils and.

Hydrogenation feedstock is subjected to hydrorefing in accordance with the steps of Example 1 using protecting catalyst and demetalization catalyst TJS2 and refining catalysts JZ4 and JZ7 shown in Table 1-4 under the following reaction conditions: a pressure of 14 MPa, a temperature of 385-390 in the top of the reactor, a temperature of 375-380 in the bottom of the reactor, a space velocity of 1.2 $hr^{-1}$ and a hydrogen-oil ratio of 1200:1, to obtain refined oil Refined oil and are distilled to obtain fractions of 300-360 which are subjected to hydrocracking respectively in accordance with the steps of Example 1 using cracking catalyst LH2 shown in Table 1-5 under the following reaction conditions: a pressure of 18 MPa, a temperature of 350-355° C. in the top of the reactor, a temperature of 340-345° C. in the bottom of the reactor, a space velocity of 0.8 $hr^{-1}$ and a hydrogen-oil ratio of 800:1, to obtain cracking products ① and ②.

Refined oil ③ is distilled to obtain a fraction of 300-360° C. which is subjected to hydrocracking in accordance with the steps of Example 1 using cracking catalyst LH3 shown in Table 1-5 under the following reaction conditions: a pressure of 14 MPa, a temperature of 385-390° C. in the top of the reactor, a temperature of 370-375° C. in the bottom of the reactor, a space velocity of 1.5 $hr^{-1}$ and a hydrogen-oil ratio of 1800:1, to obtain cracking product ③

Hydrofined oil ① and cracking product ①, hydrofined oil ② and cracking product ②, and hydrofined oil ③ and cracking product ③ are respectively mixed, filtered and distilled in accordance with the steps of Example 1 to obtain hydrogenated pitches, and shown in Table 2-3.

TABLE 2-3 the molecular weight of hydrogenated pitch and the group composition analysis

| Hydrogenated pitch | | | |
|---|---|---|---|
| HS (wt %) | 66.71 | 65.93 | 80.64 |
| HI-TS (wt %) | 30.21 | 31.90 | 18.12 |
| TI-PS (wt %) | 1.81 | 1.12 | 0.51 |
| PI-QS (wt %) | 1.23 | 1.01 | 0.71 |
| QI (wt %) | 0.04 | 0.04 | 0.02 |
| Average molecular weight | 290 | 296 | 282 |
| Softening point | 82 | 84 | 80 |

Reacting unextracted hydrogenated pitches and directly to prepare the mesophase pitches and under the following conditions: an pressure of 0.01 MPa (absolute pressure), a temperature of 410, a reaction time of 600 min, a stirring rate of 20 rpm, and nitrogen purging at the bottom of the reactor. The properties of the mesophase pitches and are shown in Table 2-4.

Reacting an unextracted hydrogenated pitch directly to prepare the mesophase pitch under the following conditions: an pressure of 1.0 MPa, a temperature of 440, a reaction time of 180 min, a stirring rate of 40 rpm, and hydrogen purging at the bottom of the reactor. The properties of the mesophase pitch are shown in Table 2-4.

TABLE 2-4 the analysis of the properties of mesophase pitch
Mesophase pitch

| Mesophase content (AC %) | Softening point (SP) | Ash content (ppm) | QI (wt %) | Density @20 (g/cm³) |
|---|---|---|---|---|
| 100 | 235 | 25 | 50.8 | 1.44 |
| 100 | 235 | 18 | 51.2 | 1.45 |
| 100 | 228 | 53 | 43.3 | 1.44 |

EXAMPLE 3

A decant oil is obtained under the conditions shown in Table 3-1 by using the coal tar shown in Table 1-1 as a raw material and the hydrogenated distillation fraction shown in Table 1-6 as an aromatic solvent.

TABLE 3-1

The analysis of the decant oil produced from hydrogenated distillation fraction of coal tar

| | Aromatic solvent | | |
|---|---|---|---|
| | Naphtha fraction | Gasoline blending component | Diesel blending component |
| The ratio of the coal tar to the aromatic solvent | 1:0.3 | 1:0.5 | 1:0.5 |
| The ratio of the coal tar to the water | 1:1.5 | 1:1.5 | 1:1.5 |
| Washing times | 2 | 2 | 2 |
| Tar:aromatic solvent:n-octane | 1:0.5:0.30 | 1:0.5:0.37 | 1:0.5:0.5 |
| The content of Cl$^-$ in the decant oil (ppm) | 4.0 | 4.2 | 3.5 |
| The content of QI in the decant oil (ppm) | 236 | 156 | 267 |
| The total content of metal ions in the decant oil (ppm) | 42.1 | 32.8 | 18.3 |
| Decant oil | | | |

The aforementioned decant oil is hydrorefined to obtain a hydrorefined oil by using the catalyst of Example 1. The operation conditions of the hydrorefining reactor are a total pressure of 16.0 MPa, an average reaction temperature of 380, a liquid hourly space velocity of 1.0 hr$^{-1}$ and a hydrogen-oil volume ratio of 1000:1. The refined oil is subjected to a suction filtration via 10 μm filer funnels buehner, and then distilled to obtain hydrogenated pitches, and shown in Table 3-2.

TABLE 3-2

The molecular weight of hydrogenated pitch and the group composition analysis

| Hydrogenated pitch | | | |
|---|---|---|---|
| HS(wt %) | 97.71 | 97.24 | 96.21 |
| HI-TS(wt %) | 1.05 | 1.56 | 2.30 |
| TI-PS(wt %) | 0.81 | 0.84 | 0.94 |
| PI-QS(wt %) | 0.41 | 0.35 | 0.51 |
| QI(wt %) | 0.02 | 0.01 | 0.04 |
| Softening point ( ) | 78 | 75 | 81 |

The hydrogenated pitch is fed into a reaction still to be subjected to thermal polymerization to obtain a mesophase pitch product. The oil gas from the top of the reaction still is cooled, separated and washed prior to being vented. The separated flash oil is used as a cracking feedstock component. The synthesis conditions under which the mesophase pitches, and as shown in Table 3-3 is obtained by using the reaction still are: an ordinary pressure, a temperature of 430, a reaction time of 300 min, a stirring rate of 30 rpm, and nitrogen purging at the top of the reaction still.

TABLE 3-3

The properties analysis of the mesophase pitch Mesophase pitch

| Mesophase content (AC %) | Softening point (SP) | Ash content (ppm) | QI (wt %) | Density @20 (g/cm$^3$) |
|---|---|---|---|---|
| 100 | 229 | 17 | 48.9 | 1.45 |
| 100 | 228 | 15 | 49.3 | 1.44 |
| 100 | 231 | 24 | 49.1 | 1.44 |

Figure 5A:
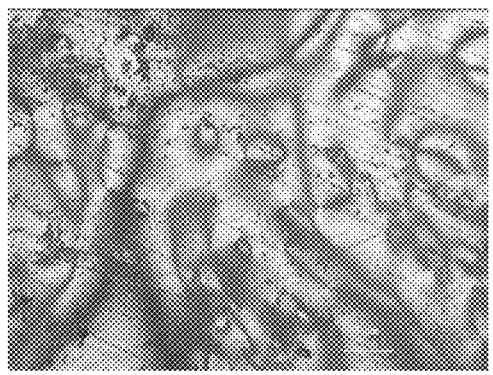
FIGS. 5A and 5B show the polarized optical micrographs of the mesophase pitch of the invention.
Figure 5B:
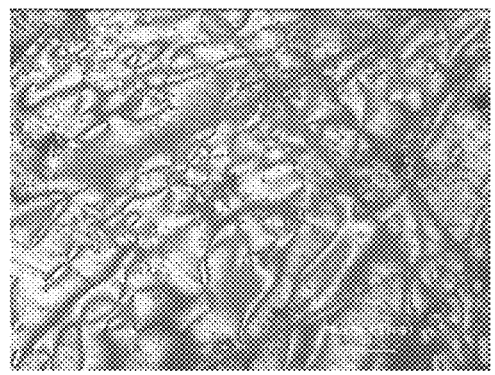

The resulted mesophase pitch is coated and fixed by an epoxy resin prior to being grinded and polished, and then is photographed by a polarizing microscope to obtain FIGS. 5A and 5B.

What is claimed is:

1. A process for producing mesophase pitch from high-temperature coal tar, comprising:
   (1) removing salts and quinoline insoluble fraction from a high-temperature coal tar to obtain a decant oil;
   (2) obtaining a hydrogenation feedstock from the decant oil via either of the following two approaches:
   (2a) using the decant oil as the hydrogenation feedstock; or
   (2b) pre-distilling the decant oil to obtain a residue with a boiling point higher than 230° C., and mixing the residue with formulated oil to obtain the hydrogenation feedstock, wherein the formulated oil comprising one or more components selected from the group consisting of distillation fractions of coal tar and the hydrogenated product of the distillation fractions of coal tar;
   (3) catalytic hydrorefining the hydrogenation feedstock to obtain a hydrofined oil;
   (4) distilling the hydrofined oil to obtain hydrogenated pitch; and
   (5) subjecting the hydrogenated pitch to the thermal polymerization to obtain the mesophase pitch,
   wherein in the distilling further comprises obtaining a hydrogenated high boiling point solvent with a boiling spread of 300-360° C. and a hydrogenated distillation fraction with a boiling spread of 80-300° C.

2. The process of claim 1, wherein the step (1) comprises:
   (1a) a step of removing salts, comprising mixing deionized water and an aromatic solvent with the high-temperature coal tar, and centrifuging them to remove washing water to obtain a desalted high-temperature coal tar with the aromatic solvent; wherein the aromatic solvent comprises one or more components selected from the group consisting of benzene, toluene, xylene, distillation fractions of coal tar and hydrogenation product of the distillation fractions of coal tar.

3. The process of claim 2, wherein in the step (1a) of removing salts, the volume ratio of the high-temperature coal tar to the aromatic solvent is 1:0.2-2, the volume ratio of the deionized water to the high-temperature coal tar is 0.5-3, and the deionized water is used to wash the high-temperature coal tar 1-3 times.

4. The process of claim 3, wherein the volume ratio of the high-temperature coal tar to the aromatic solvent is 1:0.2-0.8.

5. The process of claim 2, wherein the step (1) further comprises:
   (1b) a step of removing quinoline insoluble fraction, comprising adding a aliphatic solvent and optional the aromatic solvent into the desalted high-temperature coal tar with the aromatic solvent, and followed by centrifuging or sedimentation to remove the quinoline insoluble fraction; the aliphatic solvent comprises $C_4$-$C_{16}$ aliphatic compounds; wherein the final volume ratio of the high-temperature coal tar, the aromatic solvent and the aliphatic solvent is 1:0.2-2:0.2-1.

6. The process of claim 5, wherein the final volume ratio of the high-temperature coal tar, the aromatic solvent and the aliphatic solvent is 1:0.3-0.8:0.3-0.8.

7. The process of claim 5, wherein the aliphatic solvent is n-octane or n-heptane.

8. The process of claim 1, wherein the predistillation in the step (2b) comprises a step of recycling aliphatic solvent.

9. The process of claim 1, wherein the predistillation in the step (2b) comprises a step of obtaining at least one of BTX fraction, carbolic oil and naphthalene oil.

10. The process of claim 1, wherein the step (2) further comprises a filtering step for filtering the particles with particle size greater than 10 μm prior to the catalytic hydrorefining.

11. The process of claim 1, wherein in the step (2), the catalytic hydrorefining is conducted under conditions of a total pressure of 12.0 MPa-20.0 MPa, an average reaction temperature of 320° C.-400° C., liquid hourly space velocity of 0.5 $hr^{-1}$-2.0 $hr^{-1}$, and a hydrogen-oil ratio of 600:1-1500:1.

12. The process of claim 11, wherein in the step (2), the catalytic hydrorefining is conducted under conditions of a total pressure of 14.0 MPa-18.0 MPa, an average reaction temperature of 340° C.-390° C., liquid hourly space velocity of 0.8 $hr^{-1}$-1.2 $hr^{-1}$, and a hydrogen-oil ratio of 800:1-1200:1.

13. The process of claim 11, wherein in the step (2), the catalytic hydrorefining is conducted in the presence of the following catalyst:
hydrorefining catalyst A: employing alumina or silicon-containing alumina as a carrier which has a specific surface area of 120-300 $m^2$/g, a pore volume of 0.4-1.4 mL/g, a pore diameter of 8-20 nm, and a surface acid content of 0.05-0.1 mmol/g, and Mo or W of the group VIB metals and Co or Ni of the group VIII metals as metallic active components, based on the total weight of the hydrorefining catalyst A, the content of the group VIB metals accounted in oxide is 15-45 wt %, and the content of the group VIII metals accounted in oxide is 1.5-5 wt %.

14. The process of claim 11, wherein in the step (2), the catalytic hydrorefining is conducted in the presence of the following two catalysts:
hydrorefining catalyst A : employing alumina or silicon-containing alumina as a carrier, which has a specific surface area of 120-300 $m^2$/g, a pore volume of 0.4-1.4 mL/g, a pore diameter of 8-20 nm, a surface acid content of 0.05-0.1 mmol/g; and Mo or W of the group VIB metals and Co or Ni of the group VIII metals as metallic active components, based on the total weight of the hydrorefining catalyst A, the content of the group VIB metals accounted in oxide is 15-45 wt %, and the content of the group VIII metals accounted in oxide is 1.5-5 wt %;
hydrorefining catalyst B : employing alumina or silicon-containing alumina as a carrier, which has a specific surface area of 120-300 $m^2$/g, a pore volume of 0.4-1.2 mL/g, a pore diameter of 7-15 nm; and Mo or W of the group VIB metals and Co or Ni of the group VIII metals as metallic active components; based on the total weight of the hydrorefining catalyst B, the content of the group VIB metals accounted in oxide is 10-22 wt %, and the content of the group VIII metals accounted in oxide is 2-5 wt %.

15. The process of claim 11, wherein in the step (2), the hydrogenation feedstock is catalytic hydrorefined after passing through a protection catalyst and a demetalization catalyst, the demetalization catalyst employing alumina as a carrier which has a pore volume of 0.5-1.5 mL/g, a specific surface area of 180-350 $m^2$/g, a pore diameter of 10-50 nm; based on the total weight of the demetalization catalyst, the demetalization catalyst contains 7-20 wt % of molybdenum oxide and 2-5wt % of nickel oxide.

16. The process of claim 1, wherein the step (1) comprises:
(1a) a step of removing salts, comprising mixing deionized water and aromatic solvent with the high-temperature coal tar, and centrifuging them to remove washing water, obtaining a desalted high-temperature coal tar with the aromatic solvent, wherein the aromatic solvent is the hydrogenated high boiling point solvent.

17. The process of claim 1, wherein the step (1) comprises:
(1b) a step of removing quinoline insoluble fraction, comprising adding aliphatic solvent and optional the aromatic solvent into the desalted high-temperature coal tar with the aromatic solvent, mixing and centrifuging them or standing them for sedimentation to remove the quinoline insoluble fraction, the aliphatic solvent comprises $C_4$-$C_{16}$ aliphatic compounds, the aromatic solvent is the hydrogenated high boiling point solvent, wherein the final volume ratio of the high-temperature coal tar, the aromatic solvent and the aliphatic solvent is 1:0.3-0.8:0.3-0.8.

18. The process of claim 17, wherein the final volume ratio of the high-temperature coal tar, the hydrogenated high boiling point solvent and the aliphatic solvent is 1:0.5-0.8:0.5-0.8.

19. The process of claim 1, wherein in the step (2b), the formulated oil comprises the hydrogenated high boiling point solvent and the hydrogenated distillation fractions.

20. The process of claim 1, wherein in the step (2b), the formulated oil comprises the hydrogenated high boiling point solvent, BTX fraction, wash oil and the hydrogenated distillation fractions.

21. The process of claim 20, wherein the volume ratio of the BTX fraction or wash oil: the hydrogenated high boiling point solvent : the hydrogenated distillation fractions: the residues is 0.2-1:0-1:0-1:1.

22. The process of claim 21, wherein the volume ratio of the BTX fraction or wash oil: the hydrogenated high boiling point solvent: the hydrogenated distillation fractions: the residues is 0.2-0.4:0-0.5:0-0.5:1.

23. The process of claim 1, wherein the thermal polymerization in the step (5) comprises a step of obtaining a flash oil.

24. The process of claim 23, further comprising:
(5) catalytic hydrocracking the hydrogenated high boiling point solvent and the flash oil after mixing them to obtain a hydrocracking product.

25. The process of claim 24, wherein the catalytic hydrocracking is conducted under conditions of a total pressure of 12.0 MPa-20.0 MPa, an average reaction temperature of 340° C.-420° C., a liquid hourly space velocity of 0.5 $hr^{-1}$-2.0 $hr^{-1}$ and a hydrogen-oil ratio of 600:1-1500:1.

26. The process of claim 25, wherein the catalytic hydrocracking is conducted under conditions of a total pressure of 14.0 MPa-18.0 MPa, an average reaction temperature of 350° C.-390° C., a liquid hourly space velocity of 0.8 hr$^{-1}$-1.5 hr$^{-1}$ and a hydrogen-oil ratio of 800: 1-1200:1.

27. The process of claim 24, wherein the catalytic hydrocracking is conducted in the presence of the following catalyst:
hydrocracking catalyst: employing alumina, amorphous silica-alumina and micropore and mesopore molecular sieve as a carrier, wherein, based on the total weight of the hydrocracking catalyst, the mesopore molecular sieve accounts for 10-15 wt %, the micropore molecular sieve accounts for 5-10 wt %, the amorphous silica-alumina accounts for 15-40 wt %, the alumina accounts for 35-70 wt %; the specific surface area is 150-350 m$^2$/g, and the pore volume is 0.1-1.0 mL/g; the loaded catalyst contains 10-35 wt % of $MoO_3$ and/or $WO_3$, and 2-5 wt % of NiO and/or CoO.

28. The process of claim 24, wherein the catalytic hydrocracking is conducted in the presence of the following two catalysts:
hydrocracking catalyst: employing alumina, amorphous silica-alumina and micropore and mesopore molecular sieve as a carrier; wherein, based on the total weight of the hydrocracking catalyst, the mesopore molecular sieve accounts for 10-15 wt %, the micropore molecular sieve accounts for 5-10 wt %, the amorphous silica-alumina accounts for 15-40 wt %, the alumina accounts for 35-70 wt %; the specific surface area is 150-350 m$^2$/g, the pore volume is 0.1-1.0 mL/g; the loaded catalyst contains 10-35 wt % of $MoO_3$ and/or $WO_3$, and 2-5 wt % of NiO and/or CoO;
hydrorefining catalyst B: employing alumina or silicon-based alumina as a carrier, which has a specific surface area of 120-300 m$^2$/g, a pore volume of 0.4-1.2 mL/g, a pore diameter of 7-15 nm; and Mo or W of the group VIB metals and Co or Ni of the group VIII metals as metallic active components; based on the total weight of the hydrorefining catalyst B, the content of the group VIB metals accounted in oxide is 10-22 wt %, and the content of the group VIII metals accounted in oxide is 2-5 wt %.

29. The process of claim 24, wherein the distilling is conducted after mixing the hydrofined oil with the hydrocracking product in a volume ratio of 1:0.2-0.5 in the step (4).

30. The process of claim 24, the step (4) further comprises a filtering step for removing the particles with particle sizes greater than 10 μm prior to the distilling.

31. The process of claim 1, wherein the step (4) comprises a step of obtaining naphtha, gasoline blending component and diesel blending component.

32. The process of claim 1, wherein the thermal polymerization in the step (5) is conducted for 180-1200 minutes under conditions of a pressure of 0.01-3.0 MPa, a temperature of 380-460° C., with a stirring rate of 10-60 rpm, and purging hydrogen, nitrogen or argon at the bottom and top of the reactor.

33. The process of claim 32, wherein the thermal polymerization in the step (5) is conducted for 180-600 minutes under conditions of 0.01-1.0 MPa and a temperature of 400-440° C., with a stirring rate of 20-40 rpm, and purging nitrogen at the bottom and top of the reactor.

34. The process of claim 32, wherein the step (5) comprising online viscosity analysis.

35. The process of claim 1, comprising a step of extracting with a solvent between the steps (4) and (5).

36. The process of claim 35, wherein the solvent is an aromatic solvent comprising benzene, toluene, pyridine, quinoline or tetrahydrofuran.

37. The process of claim 3, wherein the step (1) further comprises:
(1b) a step of removing quinolone insoluble fraction, comprising adding a aliphatic solvent and optional the aromatic solvent into the desalted high-temperature coal tar with the aromatic solvent, and followed by centrifuging or sedimentation to remove the quinoline insoluble fraction; the aliphatic solvent comprises $C_4$-$C_{16}$ aliphatic compounds; wherein the final volume ratio of the high-temperature coal tar, the aromatic solvent and the aliphatic solvent is 1:0.2-2:0.2-1.

38. The process of claim 37 wherein the final volume ratio of the high-temperature coal tar, the aromatic solvent and the aliphatic solvent is 1:0.3-0.8:0.3-0.8.

39. The process of claim 37, wherein the aliphatic solvent is n-octane or n-heptane.

* * * * *